(12) United States Patent
Lin et al.

(10) Patent No.: US 11,250,577 B2
(45) Date of Patent: Feb. 15, 2022

(54) RELOCALIZATION METHOD AND APPARATUS IN CAMERA POSE TRACKING PROCESS, DEVICE, AND STORAGE MEDIUM

(71) Applicant: TENCENT TECHNOLOGY (SHENZHEN) COMPANY LIMITED, Shenzhen (CN)

(72) Inventors: Xiangkai Lin, Shenzhen (CN); Yonggen Ling, Shenzhen (CN); Linchao Bao, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 43 days.

(21) Appl. No.: 16/919,059

(22) Filed: Jul. 1, 2020

(65) Prior Publication Data
US 2020/0334836 A1 Oct. 22, 2020

Related U.S. Application Data

(63) Continuation of application No. PCT/CN2019/079781, filed on Mar. 27, 2019.

(30) Foreign Application Priority Data

Apr. 27, 2018 (CN) .......................... 201810392872.5

(51) Int. Cl.
*G06T 7/73* (2017.01)
*G06T 7/246* (2017.01)

(52) U.S. Cl.
CPC ................ *G06T 7/248* (2017.01); *G06T 7/74* (2017.01); *G06T 2207/10016* (2013.01); *G06T 2207/30204* (2013.01); *G06T 2207/30244* (2013.01)

(58) Field of Classification Search
CPC ........... G06T 7/246; G06T 7/248; G06T 7/70; G06T 7/73; G06T 7/74; G06T 7/80;
(Continued)

(56) References Cited

U.S. PATENT DOCUMENTS 6,787,750 B1   9/2004 Sauer
2017/0336511 A1* 11/2017 Nerurkar et al. .... H04N 13/271
(Continued)

FOREIGN PATENT DOCUMENTS

CN   104243833 A   12/2014
CN   106595601 A    4/2017
(Continued)

OTHER PUBLICATIONS

The State Intellectual Property Office of the People's Republic of China (SIPO) Office Action 1 for for 201810392872 dated Apr. 5, 28, 2021 13 Pages (including translation).
(Continued)

*Primary Examiner* — Andrew W Johns
(74) *Attorney, Agent, or Firm* — Anova Law Group, PLLC

(57) ABSTRACT

A relocalization method includes: obtaining, by a front-end program run on a device, a target image acquired after an $i^{th}$ marker image in the plurality of marker images; determining, by the front-end program, the target image as an $(i+1)^{th}$ marker image when the target image satisfies a relocalization condition, and transmitting the target image to a back-end program; performing, by the front-end program, feature point tracking on a current image acquired after the target image relative to the target image to obtain a first pose parameter. The back-end program performs relocalization on the target image to obtain a second pose parameter, and transmits the second pose parameter to the front-end program. The front-end program calculates a current pose (Continued)

parameter of the current image according to the first pose parameter and the second pose parameter.

20 Claims, 10 Drawing Sheets

(58) Field of Classification Search
CPC ............ G06T 7/97; G06T 2207/30204; G06T 2207/30244; G06K 9/46; G06K 9/4604
See application file for complete search history.

(56) References Cited

U.S. PATENT DOCUMENTS

| | | |
|---|---|---|
| 2017/0374256 A1 | 12/2017 | Wagner |
| 2020/0219000 A1* | 7/2020 | Wen et al. ............. G05D 1/027 |

FOREIGN PATENT DOCUMENTS

| | | |
|---|---|---|
| CN | 106708048 A | 5/2017 |
| CN | 106885574 A | 6/2017 |
| CN | 107300917 A | 10/2017 |
| CN | 107633536 A | 1/2018 |
| CN | 108537845 A | 9/2018 |
| CN | 108596976 A | 9/2018 |
| CN | 108615248 A | 10/2018 |
| CN | 108648235 A | 10/2018 |
| CN | 108682036 A | 10/2018 |
| CN | 108682038 A | 10/2018 |
| CN | 108876854 A | 11/2018 |

OTHER PUBLICATIONS

Heng Cao, "Research on SLAM Algorithm Based on Monocular Vision," China Excellent Master's Thesis Full-text Database Information Technology Series, Jan. 15, 2018 (Jan. 15, 2018). 63 pages.

The World Intellectual Property Organization (WIPO) International Search Report for PCT/CN2019/079781 dated Jul. 2, 2019 5 Pages (including translation).

The State Intellectual Property Office of the People's Republic of China (SIPO) Office Action 2 for for 201810392872.5 dated Oct. 26, 2021 13 Pages (including translation).

Fang He, "Design and Implementation of Quadrotors Based on Stereo Vision," China Excellent Master's Thesis Full-text Database Engineering Science, Series II, Feb. 15, 2015 (Feb. 15, 2018). 78 pages.

* cited by examiner

RELOCALIZATION METHOD AND APPARATUS IN CAMERA POSE TRACKING PROCESS, DEVICE, AND STORAGE MEDIUM

CROSS REFERENCES TO RELATED APPLICATIONS

This application is a continuation application of PCT Patent Application No. PCT/CN2019/079781, filed on Mar. 27, 2019, claims priority to Chinese Patent Application No. 201810392872.5, entitled "RELOCALIZATION METHOD AND APPARATUS IN CAMERA POSE TRACKING PROCESS, DEVICE, AND STORAGE MEDIUM" filed on Apr. 27, 2018, the entire contents of both of which are incorporated herein by reference.

FIELD OF THE TECHNOLOGY

Embodiments of the present disclosure relate to the field of augmented reality (AR), and in particular, to a relocalization method and apparatus in a camera pose tracking process, a device, and a storage medium.

BACKGROUND OF THE DISCLOSURE

In the field of AR, a subject equipped with a camera needs to track a movement pose of the camera in the real environment during movement without a priori information of the environment.

In the related art, a movement process of a camera is divided into at least two tracking processes to perform tracking, and each tracking process corresponds to a respective marker image. Generally, the first frame of image acquired by the camera is used as the first marker image. In a case that the camera subsequently acquires a current image, a device tracks a common feature point between the current image and the first marker image, and calculates a change of a camera pose of the camera in the real world according to a position change of the feature point between the current image and the first marker image. In a case that a tracking effect of the current image relative to an $i^{th}$ marker image is poorer than a preset condition, a previous image of the current image is switched to an $(i+1)^{th}$ marker image, and an $(i+1)^{th}$ tracking process is started, i being a positive integer.

SUMMARY

Embodiments of the present disclosure provide a relocalization method and apparatus in a camera pose tracking process, a device, and a storage medium, to resolve a problem that a relocalization process consumes a relatively long time, and as a result a main thread may be blocked and a relocalization result may be obtained only after several frames of image. The technical solutions are as follows:

According to an aspect of the present disclosure, a relocalization method in a camera pose tracking process is provided. The method includes: obtaining, by a front-end program run on a device, a target image acquired after an $i^{th}$ marker image in the plurality of marker images, i being a positive integer. The front-end program is responsible for sequentially performing the camera pose tracking process on a plurality of marker images. The front-end program also determines the target image as an $(i+1)^{th}$ marker image upon determining that the target image satisfies a relocalization condition; transmits the target image to a back-end program; and performs feature point tracking on a current image acquired after the target image relative to the target image to obtain a first pose parameter. The back-end program performs relocalization on the target image to obtain a second pose parameter, and transmits the second pose parameter to the front-end program. The front-end program also calculates a current pose parameter of the current image according to the first pose parameter and the second pose parameter.

According to another aspect of the present disclosure, a relocalization apparatus is provided, the apparatus including a memory; and one or more processors coupled to the memory and configured to execute a front-end program and a back-end program. The front-end program is configured to sequentially perform a camera pose tracking process on a plurality of marker images; obtain a target image acquired after an $i^{th}$ marker image in the plurality of marker images, i being a positive integer; determine the target image as an $(i+1)^{th}$ marker image upon determining that the target image satisfies a relocalization condition, and transmit the target image to the back-end program; and perform feature point tracking on a current image acquired after the target image relative to the target image to obtain a first pose parameter, the first pose parameter representing a camera pose change from the target image to the current image. The back-end program performs relocalization on the target image to obtain a second pose parameter, and transmits the second pose parameter to the front-end program. The front-end program also calculates a current pose parameter of the current image according to the first pose parameter and the second pose parameter. According to another aspect of the present disclosure, a non-transitory computer-readable storage medium is provided, the storage medium storing at least one instruction, the at least one instruction being loaded and executed by a processor to perform: obtaining, by a front-end program run on a device, a target image acquired after an $i^{th}$ marker image in the plurality of marker images, i being a positive integer. The front-end program is responsible for sequentially performing the camera pose tracking process on a plurality of marker images. The front-end program also determines the target image as an $(i+1)^{th}$ marker image upon determining that the target image satisfies a relocalization condition; transmits the target image to a back-end program; and performs feature point tracking on a current image acquired after the target image relative to the target image to obtain a first pose parameter. The back-end program performs relocalization on the target image to obtain a second pose parameter, and transmits the second pose parameter to the front-end program. The front-end program also calculates a current pose parameter of the current image according to the first pose parameter and the second pose parameter.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make objectives, technical solutions, and advantages of the present disclosure clearer, the following further describes in detail implementations of the present disclosure with reference to the accompanying drawings.

Several nouns used in the present disclosure are briefly described first:

AR is a technology that as a camera acquires an image, a camera pose parameter of the camera in the real world (or referred to as the three-dimensional world or the actual world) is calculated in real time, and a virtual element is added according to the camera pose parameter to the image acquired by the camera. The virtual element includes, but is not limited to, an image, a video, and a three-dimensional model. The objective of the AR technology is to overlay the virtual world on a screen onto the real world to perform interaction. The camera pose parameter includes a rotation matrix and a displacement vector. The rotation matrix is used to represent a rotation angle of the camera in the real world. The displacement vector is used to represent a displacement distance of the camera in the real world.

Figure 1:
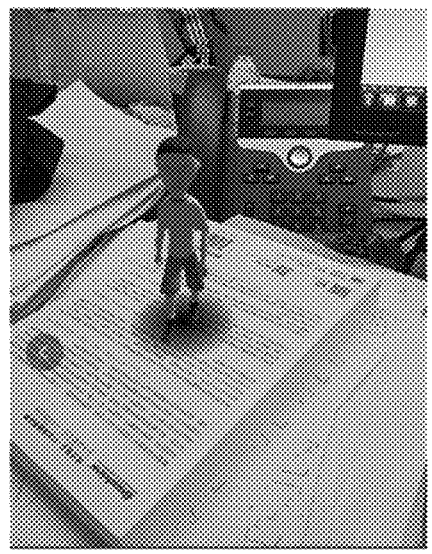
FIG. 1 is a schematic scenario diagram of an AR application scenario according to an exemplary embodiment of the present disclosure.
Figure 2:
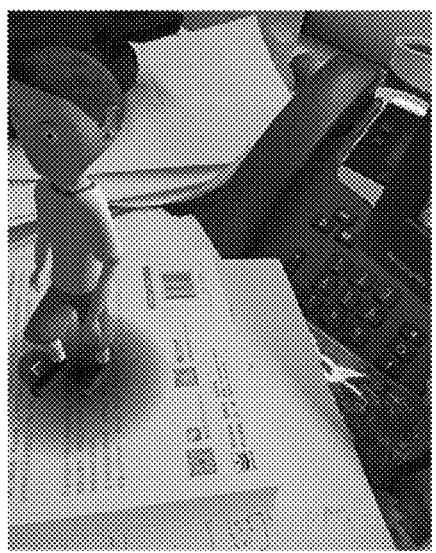
FIG. 2 is a schematic scenario diagram of an AR application scenario according to an exemplary embodiment of the present disclosure.

For example, referring to FIG. 1 and FIG. 2, a device adds a figure of a virtual human to an image photographed by a camera. As the camera moves in the real world, the image photographed by the camera changes, and a photographing position of the virtual human also changes, thereby simulating an effect that the virtual human is still in the image and the camera photographs the image and the virtual human while the position and pose are changing, so as to present a realistic three-dimensional picture to a user.

An anchor-switching AR system is an AR system that determines a camera pose parameter in a natural scene based on camera pose tracking of a plurality of sequential marker images and overlays the virtual world according to the camera pose parameter onto an image acquired by a camera. The marker images may also be referred as anchors.

An inertial measurement unit (IMU) is an apparatus configured to measure tri-axial attitude angles (or angular velocities) and accelerations of an object. Generally, the IMU includes three uniaxial accelerometers and three uniaxial gyroscopes. The accelerometer is configured to detect an acceleration signal of an object on each coordinate axis of a three-dimensional coordinate system, to calculate the displacement vector (errors may accumulate as time elapses). The gyroscopes are configured to detect a rotation matrix of the object in the three-dimensional coordinate system. Optionally, the IMU includes a gyroscope, an accelerometer, and a geomagnetic sensor.

Schematically, a manner of establishing a three-dimensional coordinate system is as follows: 1. The X axis is defined by a vector product Y*Z, and a direction tangential to the ground at a current position of the device on the X axis points to the east. 2. A direction tangential to the ground at the current position of the device on the Y axis points to the north pole of the geomagnetic field. 3. The Z axis points to the sky and is perpendicular to the ground.

Relocalization: In a camera pose tracking process based on an $i^{th}$ marker image, in a case that feature point tracking performed on a target image relative to an $i^{th}$ marker image fails and the camera pose tracking process cannot be successfully performed, feature point tracking is performed again on a target image relative to another image (the first marker image or another representative keyframe), so that in a case that feature point tracking succeeds, positioning of a camera pose of the camera during acquisition of the target image is implemented according to a regained tracking process.

Figure 3:
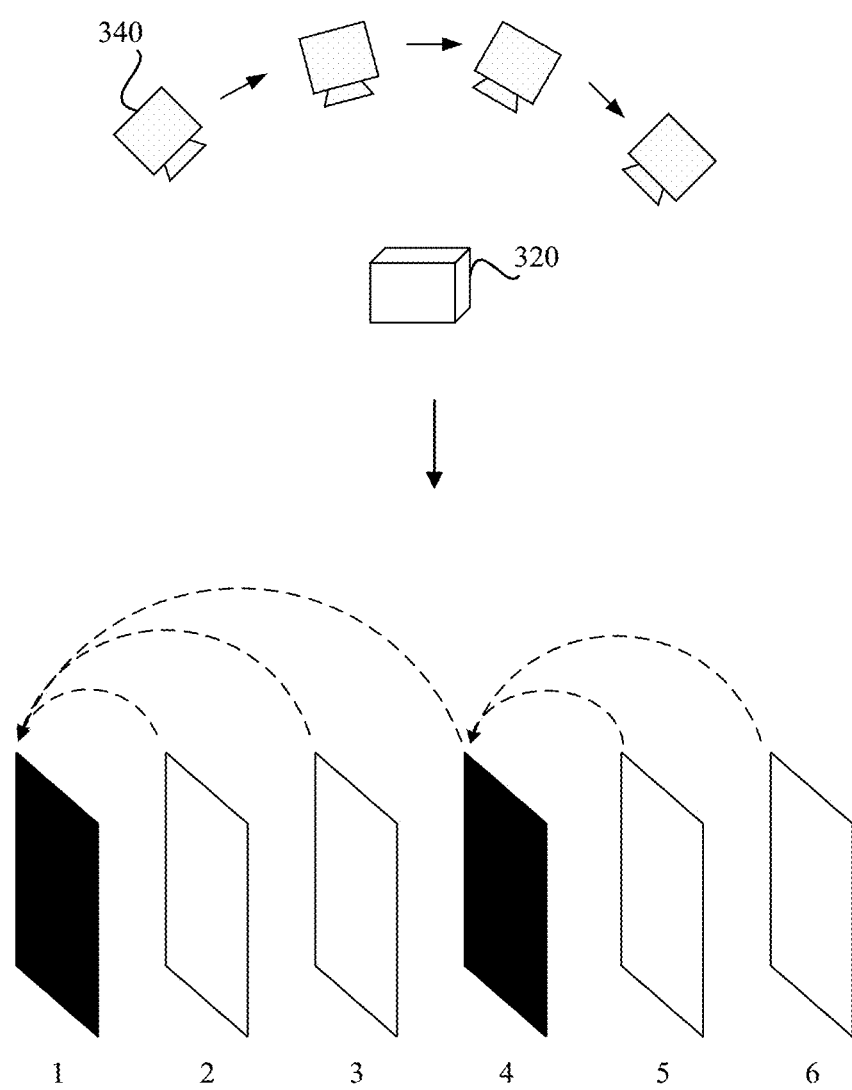
FIG. 3 is a schematic diagram of the principle of an anchor-switching AR system algorithm according to an exemplary embodiment of the present disclosure.

The present disclosure provides a relocalization method applicable to an anchor-switching AR system algorithm. In the anchor-switching AR system algorithm, in a process of determining a camera pose, a movement process of a camera is divided into at least two tracking processes to perform tracking, and each tracking process corresponds to a respective marker image. Specifically, in a tracking process corresponding to an $i^{th}$ marker image, in a case that a tracking effect of a current image relative to the $i^{th}$ marker image is poorer than a preset condition (for example, a quantity of feature points that can be obtained through matching is less than a preset threshold), a previous image of the current image is determined as an $(i+1)^{th}$ marker image, and an $(i+1)^{th}$ tracking process is started, i being a positive integer. Schematically, FIG. 3 is a schematic diagram of the principle of the anchor-switching AR system algorithm according to an exemplary embodiment of the present disclosure. An object 320 exists in the real world, a device 340 provided with a camera is held by a user to move, and a plurality of frames of image 1 to 6 including the object 320 are photographed during movement. The device determines the image 1 as the first marker image (born-marker or born-image) and records an initial pose parameter. The initial pose parameter may be a pose parameter of the camera during acquisition of an image 1 and acquired by an IMU. Feature point tracking is then performed on the image 2 relative to the image 1, and a pose parameter of the camera during the photographing of the image 2 is calculated according to the initial pose parameter and a feature point tracking result. Feature point tracking is performed on the image 3 relative to the image 1, and a pose parameter of the camera during the photographing of the image 3 is calculated according to the initial pose parameter and a feature point tracking result. Feature point tracking is performed on the image 4 relative to the image 1, and a pose parameter of the camera during the photographing of the image 4 is calculated according to the initial pose parameter and a feature point tracking result.

Feature point tracking is then performed on the image 5 relative to the image 1. The image 4 is determined as the second marker image in a case that the effect of feature point tracking is poorer than a preset condition (for example, there is a relatively small quantity of matching feature points). Feature point tracking is performed on the image 5 relative to the image 4, and a displacement change amount of the camera during the photographing of the image 4 and the photographing of the image 5 is calculated. A displacement change amount of the camera between the photographing of the image 4 and the photographing of the image 1 and the initial pose parameter are then combined to calculate a pose parameter of the camera during the photographing of the image 5. Feature point tracking is then performed on the image 6 relative to the image 4. The rest is deduced by analogy. A previous frame of image of the current image may be determined as a new marker image in a case that the effect of feature point tracking of the current image deteriorates, and feature point tracking is performed again after switching to the new marker image.

Optionally, an algorithm based on a visual odometry principle such as a feature point method or a direct method may be used for feature point tracking. However, in various abnormal scenarios such as that the camera moves relatively intensely, moves toward an intense light source, and moves toward a white wall in a tracking process, a loss phenomenon may occur in the foregoing tracking process of an anchor-switching AR system. The loss phenomenon means that sufficient feature points cannot be obtained from a target image through matching, resulting in a feature point tracking failure. In this case, relocalization needs to be performed on the target image. However, a relocalization process consumes a relatively long time, and as a result a main thread may be blocked, and a relocalization result may be obtained only after several frames of image.

Figure 4:
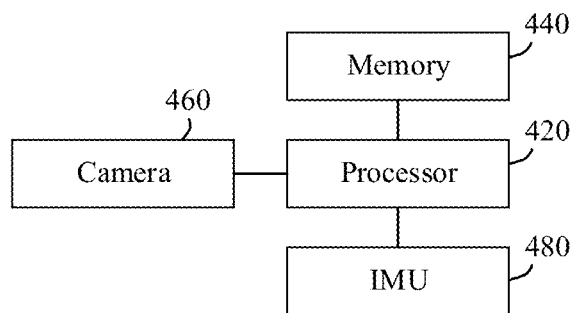
FIG. 4 is a structural block diagram of an electronic device according to an exemplary embodiment of the present disclosure.

FIG. 4 is a structural block diagram of an electronic device according to an exemplary embodiment of the present disclosure. The electronic device includes a processor 420, a memory 440, a camera 460, and an IMU 480.

The processor 420 includes one or more processing cores, for example, a 4-core processor, an 8-core processor, and the like. The processor 420 is configured to execute at least one of an instruction, a code, a code segment, and a program stored in the memory 440.

The processor 420 is electrically connected to the memory 440. Optionally, the processor 420 is connected to the memory 440 by a bus. The memory 440 stores one or more instructions, codes, code segments and/or programs. The instruction, code, code segment and/or program is executed by the processor 420 to implement a relocalization method in a camera pose tracking process provided in the following embodiments.

The processor 420 is further electrically connected to the camera 460. Optionally, the processor 420 is connected to the camera 460 by a bus. The camera 460 is a sensing device having an image acquisition capability. The camera 460 may also be referred to as a photosensitive device, among other names. The camera 460 has a capability of consecutively acquiring images or repeatedly acquiring images. Optionally, the camera 460 is disposed inside or outside the device.

The processor 420 is further electrically connected to the IMU 480. Optionally, the IMU 480 is configured to: acquire a pose parameter (e.g., matrix/vector) of the camera at an interval of a predetermined time, and record a time stamp of each group of pose parameters during acquisition. The pose parameter of the camera includes a displacement vector and a rotation matrix. The rotation matrix acquired by the IMU 480 is relatively accurate, and the acquired displacement vector may have a relatively large error due to an actual environment.

Figure 5:
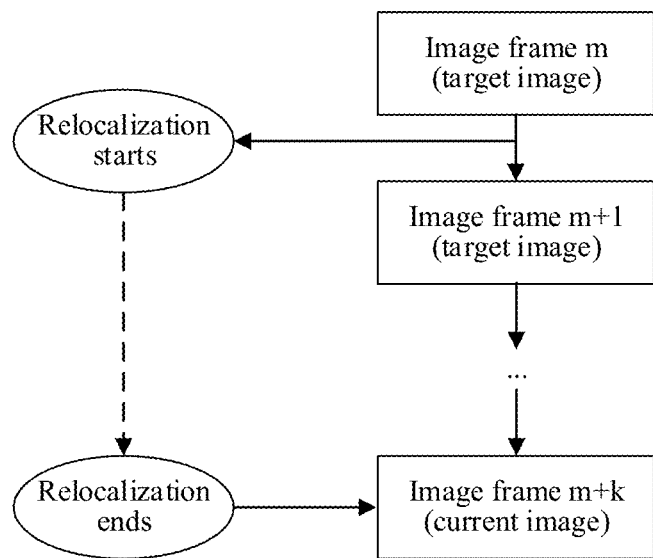
FIG. 5 is a schematic diagram of the timing of a relocalization process according to an exemplary embodiment of the present disclosure.

An embodiment of the present disclosure provides a relocalization architecture of "a front-end program+a back-end program". The front-end program is run in a main thread, and the back-end program is run in another thread. The front-end program is used to sequentially perform a camera pose tracking process on a plurality of marker images. The back-end program is used to perform relocalization on a target image in a case that the target image satisfies a relocalization condition. Inter-process communication is implemented between the front-end program and the back-end program by using a result module (also referred as result storage space). In the process of implementing the present disclosure, the inventor finds that in a case that a relocalization process is executed in the front-end program, because the time of the relocalization process is usually relatively long, the normal operation of the front-end program may be blocked. However, in a case that the relocalization process is executed in the back-end program, because the back-end program cannot control the time of obtaining a successful relocalization result, a relocalization result before several frames of image may be obtained and cannot be directly used for relocalization of a current image. As shown in FIG. 5, it is assumed that the front-end program processes an image frame m (referred to as a target image in the following embodiments), the image frame m is prone to a loss phenomenon, and the back-end program starts to perform relocalization on the image frame m. In a case that the back-end program obtains a relocalization result of the image frame m, that is, relocalization ends, the front-end program already starts to process an image frame m+k, the relocalization result of the image frame m cannot be directly used as a result for correcting the image frame m+k. For this, the present disclosure provides the following embodiments.

Figure 6:
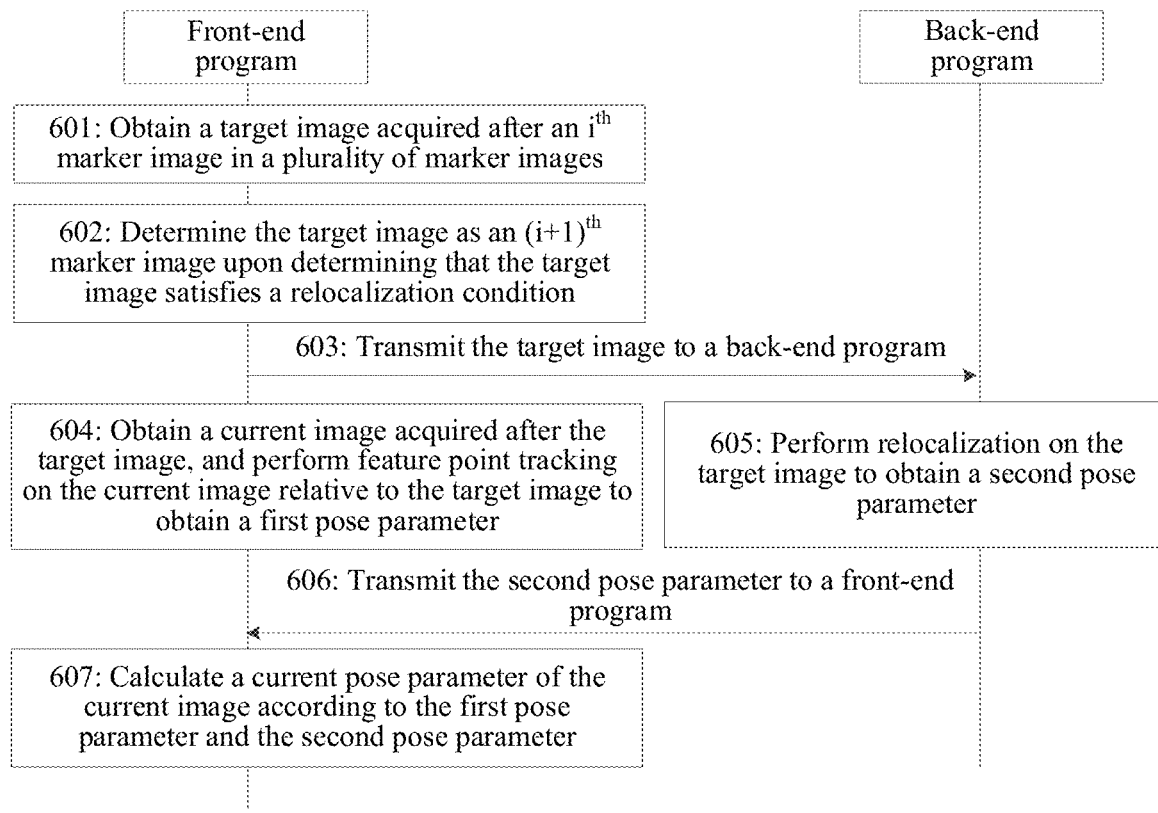
FIG. 6 is a flowchart of a relocalization method in a camera pose tracking process according to an exemplary embodiment of the present disclosure.

FIG. 6 is a flowchart of a relocalization method in a camera pose tracking process according to an embodiment of the present disclosure. Some embodiments are described by using an example in which the relocalization method is applied to the device shown in FIG. 4. The method includes the following steps:

Step 601: A front-end program obtains a target image acquired after an $i^{th}$ marker image in a plurality of marker images, i being a positive integer.

A camera in the device acquires frames of image at an interval of a preset time to form an image sequence. Optionally, the camera acquires frames of image at an interval of a preset time in a movement (translation and/or rotation) process to form an image sequence.

Optionally, the front-end program determines the first frame of image in the image sequence (or one frame of image satisfying a predetermined condition in several frames of image in the front) as the first marker image, performs feature point tracking on a subsequently acquired image relative to the first marker image, and calculates a camera pose parameter of the camera according to a feature point tracking result. In a case that the effect of feature point tracking of a current image is poorer than a preset condition (for example, a relatively small quantity of feature points are obtained through matching), a previous frame of image of the current image is determined as the second marker image, feature point tracking is performed on a subsequently acquired image relative to the second marker image, and the camera pose parameter of the camera is calculated according to a feature point tracking result. The rest is deduced by analogy. The front-end program may sequentially perform camera pose tracking on a plurality of consecutive marker images.

Step 602: The front-end program switches the target image to an $(i+1)^{th}$ marker image upon determining that the target image satisfies a relocalization condition. As used herein, switching the target image to an $(i+1)^{th}$ marker image may refer to assigning the $(i+1)^{th}$ marker image to be the same as the target image.

The device determines whether the current image satisfies the relocalization condition. The relocalization condition is used to indicate that a tracking process of the current image relative to the $i^{th}$ marker image fails, or, the relocalization condition is used to indicate that an accumulated error in historical tracking processes is already greater than the preset condition.

In an optional embodiment, the device tracks the current image relative to the $i^{th}$ marker image, and determines that a tracking process of the current image relative to the $i^{th}$ marker image fails, and the current image satisfies the relocalization condition in a case that a feature point matching the $i^{th}$ marker image does not exist in the current image or a quantity of feature points in the current image that match the $i^{th}$ marker image is less than a first quantity.

In another optional embodiment, the device determines that an accumulated error in historical tracking processes is already greater than the preset condition in a case that the device determines that a quantity of frames between the current image and an image in previous relocalization is greater than a second quantity, or the device determines that an accumulated error in historical tracking processes is already greater than the preset condition in a case that the device determines that a quantity of marker images between the $i^{th}$ marker image and the first marker image is greater than a third quantity.

Specific condition content of the relocalization condition is not limited in this embodiment.

In a case that the front-end program determines that the target image satisfies the relocalization condition, the front-end program switches the target image to an $(i+1)^{th}$ marker image, and temporarily uses a camera pose parameter including $R_{old}$ and $T_{old}$ (there may be an error) acquired by an IMU as a reference pose parameter of the $(i+1)^{th}$ marker image. $R_{old}$ is used to represent a rotation matrix of the camera from the first marker image to the $(i+1)^{th}$ marker image (the target image), and $T_{old}$ is used to represent a displacement vector of the camera from the first marker image to the $(i+1)^{th}$ marker image (the target image).

Step 603: The front-end program transmits the target image to a back-end program. In other words, the front-end program transmits the $(i+1)^{th}$ marker image to the back-end program running on the same device.

Optionally, the front-end program uses a result module to transmit the target image to the back-end program. The result module is a storage space shared by the front-end program and the back-end program. The back-end program is used to perform relocalization on the target image relative to another image. The another image includes the first marker image and/or a representative keyframe with past successful relocalization.

Step 604: The front-end program obtains a current image acquired after the target image, and performs feature point tracking on the current image relative to the target image (i.e., the $(i+1)^{th}$ marker image) to obtain a first pose parameter.

After providing the target image to the back-end program, the front-end program obtains a current image acquired after the $(i+1)^{th}$ marker image (a target image), and performs feature point tracking on the current image relative to the target image, to obtain the first pose parameter.

The first pose parameter is used to represent a camera pose change from the target image to the current image. The first pose parameter includes a first rotation matrix $R_{ca}$ and a first displacement vector $T_{ca}$. $R_{ca}$ is used to represent a rotation matrix of the camera from the $(i+1)^{th}$ marker image (the target image) to the current image, and $T_{ca}$ is used to represent a displacement vector of the camera from the $(i+1)^{th}$ marker image (the target image) to the current image.

Step 605: The back-end program performs relocalization on the target image to obtain a second pose parameter.

In parallel with step 604, the back-end program performs relocalization on the target image relative to another image to obtain the second pose parameter.

The second pose parameter is used to represent a camera pose change from the first marker image to the target image. The second pose parameter includes a second rotation matrix $R_{relocalize}$ and a second displacement vector $T_{relocalice}$. $R_{relocalice}$ is used to represent a rotation matrix of the camera from the first marker image to the $(i+1)^{th}$ marker image (the target image) and is a correction value that is obtained through relocalization and is used for $R_{old}$. $T_{relocalice}$ is used to represent a displacement vector of the camera from the first marker image to the $(i+1)^{th}$ marker image (the target image) and is a correction value that is obtained through relocalization and used for $T_{old}$.

Step 606: The back-end program transmits the second pose parameter to the front-end program.

Optionally, after performing a relocalization process on the target image, the back-end program transmits the second pose parameter obtained through relocalization to the second pose parameter by using the result module.

Step 607: The front-end program calculates a current pose parameter of the current image according to the first pose parameter and the second pose parameter.

Optionally, the front-end program performs calculation according to the following formula to obtain a current pose parameter including $R_{m+k}$ and $T_{m+k}$ as follows:

$$\begin{bmatrix} R_{m+k} & T_{m+k} \\ 0 & 1 \end{bmatrix} = \begin{bmatrix} R_{ca} & s*T_{ca} \\ 0 & 1 \end{bmatrix} * \begin{bmatrix} R_{relocalize} & T_{relocalize} \\ 0 & 1 \end{bmatrix},$$

the first pose parameter including a first rotation matrix $R_{ca}$ and a displacement vector $T_{ca}$, the second pose parameter including the second rotation matrix $R_{relocalize}$ and the second displacement vector $T_{relocalice}$, and s being a scale corresponding to the target image.

Optionally, s is preset value, or, s is a projected feature point obtained after the front-end program maps an initial feature point in the first marker image to the target image, and a scale corresponding to the target image is calculated according to an average depth of the projected feature point.

In some embodiments, a virtual object may be overlay on the current image and/or an image consecutively captured after the current image at a location determined based on the current pose parameter. The virtual object may be consistently overly on the images captured based on their corresponding pose parameters, such as the example shown in FIGS. 1-2. The images (e.g., target image, current image, anchor images) may be captured by a camera embedded on the device. The processed images (i.e., images overlay with virtual object) may be displayed on the screen of the device to present an AR effect.

In some embodiments, after the target image (e.g., an image captured at jth moment) is determined to be used as the $(i+1)^{th}$ marker image, the image(s) captured afterwards are considered as new target image. In other words, the front-end program may determine whether an image captured at (j+k)th moment satisfies a relocalization condition, k being a positive integer, and if yes, determine that the image captured at the (j+k)th moment as (i+2)th marker image, and send to the back-end program for relocalization.

In conclusion, by means of the relocalization method provided in some embodiments, a front-end program switches a target image to an $(i+1)^{th}$ marker image. As a back-end program performs relocalization on the target image, the front-end program performs camera pose tracking based on the $(i+1)^{th}$ marker image in parallel to obtain a first pose parameter. The first pose parameter and the second pose parameter are used to correct a positioning result of a current image in a case that a relocalization result (a second pose parameter) is obtained during processing of the current image by the front-end program, thereby resolving a problem that the back-end program cannot control the time of obtaining a successful relocalization result, and a relocalization result obtained several frames of image before cannot be directly used for relocalization of a current image. Even if it takes a relatively long time for the back-end program to obtain a relocalization result, two pose change amounts can be added to correct the positioning result of the current image, thereby ensuring a relatively adequate relocalization effect.

Figure 7:
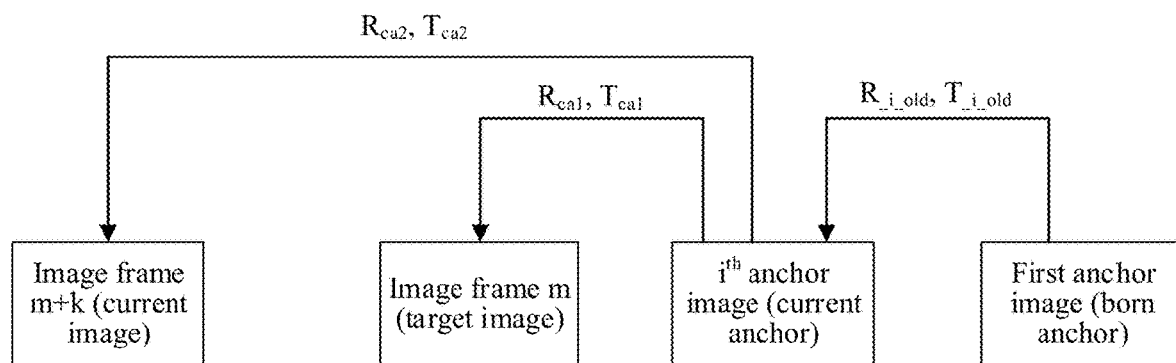
FIG. 7 is a diagram showing a calculation principle of a normal tracking process according to an exemplary embodiment of the present disclosure.

To describe the foregoing relocalization principle from another perspective, a normal tracking process and a relocalization success process are described with reference to FIG. 7 and FIG. 8.

Normal tracking process (FIG. 7): In a camera pose tracking process based on an $i^{th}$ marker image, it is set that the $i^{th}$ marker image has a pose change amount including $R_{\_i\_old}$ and $T_{\_i\_old}$ relative to the first marker image. In a case that feature point tracking is performed on an image frame m relative to the $i^{th}$ marker image succeeds, to obtain a pose change amount including $R_{cal}$ and $T_{cal}$, a camera pose parameter of the image frame m is calculated by using the following formula:

$$\begin{bmatrix} R_m & T_m \\ 0 & 1 \end{bmatrix} = \begin{bmatrix} R_{cal} & s*T_{cal} \\ 0 & 1 \end{bmatrix} * \begin{bmatrix} R_{\_i\_old} & T_{\_i\_old} \\ 0 & 1 \end{bmatrix},$$

$s_i$ being a scale corresponding to the $i^{th}$ marker image.

In a case that feature point tracking performed on the image frame m+k relative to the $i^{th}$ marker image succeeds, to obtain a pose change amount including $R_{ca2}$ and $T_{ca2}$, a camera pose parameter of the image frame m+k is calculated by using the following formula:

$$\begin{bmatrix} R_{m+k} & T_{m+k} \\ 0 & 1 \end{bmatrix} = \begin{bmatrix} R_{ca2} & s_i*T_{ca2} \\ 0 & 1 \end{bmatrix} * \begin{bmatrix} R_{\_i\_old} & T_{\_i\_old} \\ 0 & 1 \end{bmatrix}.$$

Successful relocalization (FIG. 8): In a camera pose tracking process based on the $i^{th}$ marker image, a target image is lost, and the front-end program switches the target image to an $(i+1)^{th}$ marker image. A reference pose parameter acquired by an IMU is used as a pose change amount including $R_{old}$ and $T_{old}$ of the $(i+1)^{th}$ marker image relative to the first marker image. In a case that relocalization performed on the target image by the back-end program succeeds, to obtain a relocalization result ($R_{relocalize}$ and $T_{relocalice}$), a camera pose parameter of the current image (the image frame m+k) is calculated by using the following formula:

$$\begin{bmatrix} R_{m+k} & T_{m+k} \\ 0 & 1 \end{bmatrix} = \begin{bmatrix} R_{ca} & s_{i+1}*T_{ca} \\ 0 & 1 \end{bmatrix} * \begin{bmatrix} R_{relocalize} & T_{relocalize} \\ 0 & 1 \end{bmatrix}.$$

Figure 9:
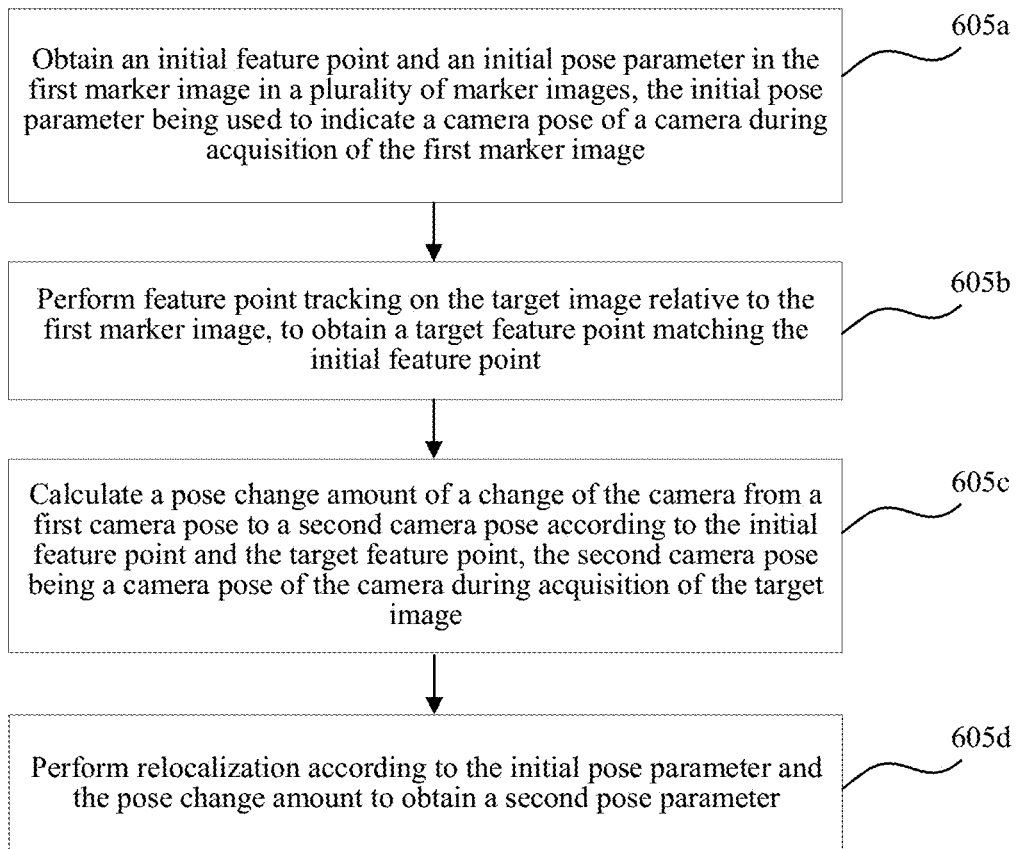
FIG. 9 is a flowchart of a relocalization method in a camera pose tracking process according to an exemplary embodiment of the present disclosure.

In the optional embodiment based on FIG. 6, the back-end program performs relocalization on the target image relative to the first marker image, to obtain the second pose parameter. As shown in FIG. 9, the foregoing step 605 includes the following sub-steps:

Step 605a: Obtain an initial feature point and an initial pose parameter in the first marker image, the initial pose parameter being used to indicate a camera pose of a camera during acquisition of the first marker image.

The back-end program attempts to perform feature point tracking on the current image relative to the first marker image. In this case, the device obtains a cached initial feature point and initial pose parameter in the first marker image, the initial pose parameter being used to indicate a camera pose of the camera during acquisition of the first marker image.

Step 605b: Perform feature point tracking on the target image relative to the first marker image, to obtain a target feature point matching the initial feature point.

Optionally, each matching feature point pair includes one initial feature point and one target feature point that match each other.

A tracking algorithm based on visual odometry may be used for feature point tracking. This is not limited in the present disclosure. In an embodiment, a Kanade-Lucas (KLT) optical flow tracking algorithm is used for feature point tracking. In another embodiment, for feature point tracking, a SIFT feature descriptor extracted based on a scale-invariant feature transform (SIFT) algorithm and an ORB feature descriptor extracted based on an oriented FAST and rotated BRIEF (ORB, fast feature point extraction and description) algorithm are used to perform feature point tracking. In the present disclosure, a specific algorithm for feature point tracking is not limited, and a feature point method or a direct method may be used for a feature point tracking process.

In an embodiment, the back-end program performs feature point extraction on the first marker image, to obtain N initial feature points. The device further performs feature point extraction on the target image, to obtain M candidate feature points. The device then matches the M candidate feature points one by one against the N initial feature points, to determine at least one matching feature point pair. Each matching feature point pair includes an initial feature point and a target feature point. The initial feature point is a feature point in the first marker image, and the target feature point is a candidate feature point that is in the target image and has the highest matching degree with an initial feature point.

Optionally, a quantity of initial feature points is greater than or equal to a quantity of target feature points. For example, there are 450 initial feature points, and there are 320 target feature points.

Step 605c: Calculate a second pose parameter of a change of the camera from the initial pose parameter to a target pose parameter according to the initial feature point and the target feature point, the target pose parameter being used to represent a camera pose of the camera during acquisition of the target image. In some embodiments, a pose change amount of a change of the camera from a first camera pose to a second camera pose according to the initial feature point and the target feature point, the second camera pose being a camera pose of the camera during acquisition of the target image.

Optionally, the device calculates a homography matrix between two frames of image according to the initial feature point and the target feature point; and decomposes the homography matrix to obtain a pose change amount including $R_{relocalize}$ and $T_{relocalize}$ of the change of the camera from the initial pose parameter to the target pose parameter.

The homography matrix describes a mapping relationship between two planes. The homography matrix may be used to perform movement estimation in a case that feature points in the natural scenario (the real environment) all fall in a same physical plane. The device uses ransac to decompose the homography matrix in a case that there are at least four pairs of matching initial feature points and target feature points, to obtain a rotation matrix $R_{relocalize}$ and a translation vector $T_{relocalize}$.

$R_{relocalize}$ is a rotation matrix of the change of the camera from the initial pose parameter to the target pose parameter, and $T_{relocalize}$ is a displacement vector of the change of the camera from the initial pose parameter to the target pose parameter.

Step 605d: Perform relocalization according to the initial pose parameter and the pose change amount to obtain the second pose parameter.

After performing conversion on the initial pose parameter by using the pose change amount, the device performs relocalization to obtain the second pose parameter including $R_{relocalize}$ and $T_{relocalice}$, so as to calculate the camera pose of the camera during acquisition of the target image.

Figure 8:
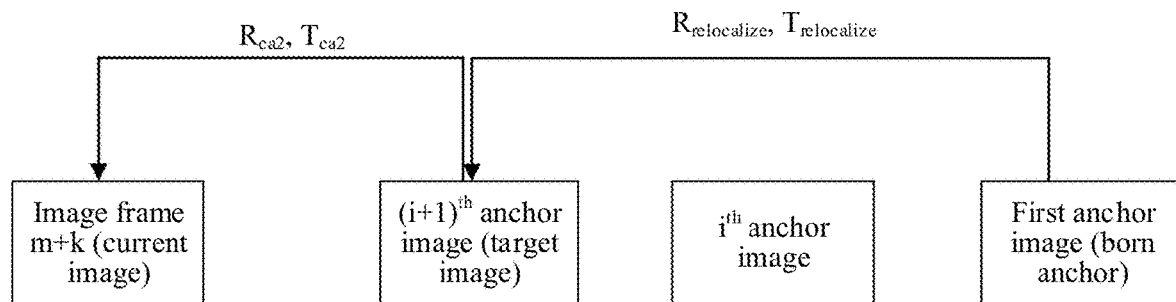
FIG. 8 is a diagram showing a calculation principle of a relocalization process according to an exemplary embodiment of the present disclosure.
Figure 10:
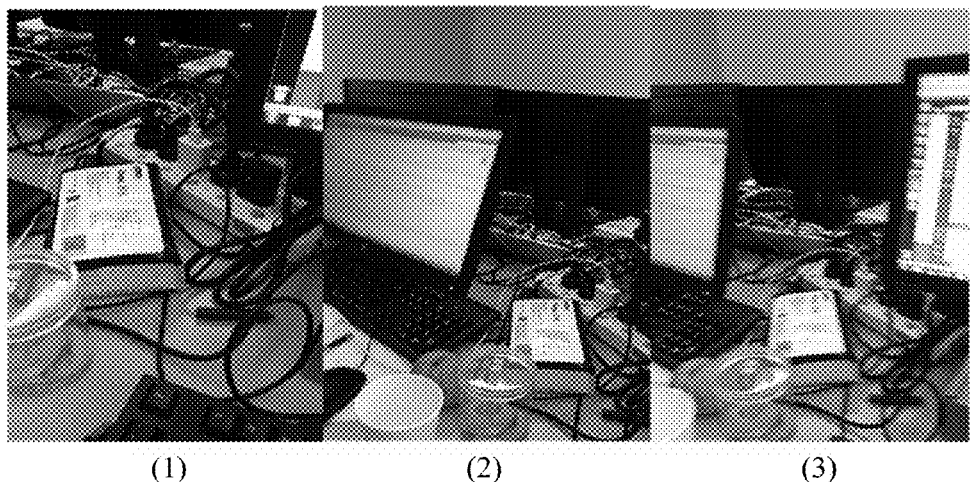
FIG. 10 is a schematic diagram of comparison among the first marker image, a target image, and a first-order keyframe according to an exemplary embodiment of the present disclosure.

In the relocalization method shown in FIG. 8, relocalization is performed on a target image relative to the first marker image. In the method, relocalization may fail in some scenarios. For example, in a case that a photographing pose corresponding to the target image is greatly different from a photographing pose of the first marker image, relocalization implemented by directly establishing a match between the target image and the first marker image may fail. Schematically, it is set that the picture (1) in FIG. 10 is the first marker image, and the picture (2) in FIG. 10 is the target image. Because there is an excessively small overlapping area between the target image and the first marker image, and a sufficient matching degree is not reached, relocalization directly performed on the target image and the first marker image fails. In an optional embodiment of the present disclosure, the picture (3) in FIG. 10 is introduced as a first-order keyframe, and relocalization is performed on the target image relative to a first-order keyframe, so that the success probability of relocalization can be improved.

Figure 11:
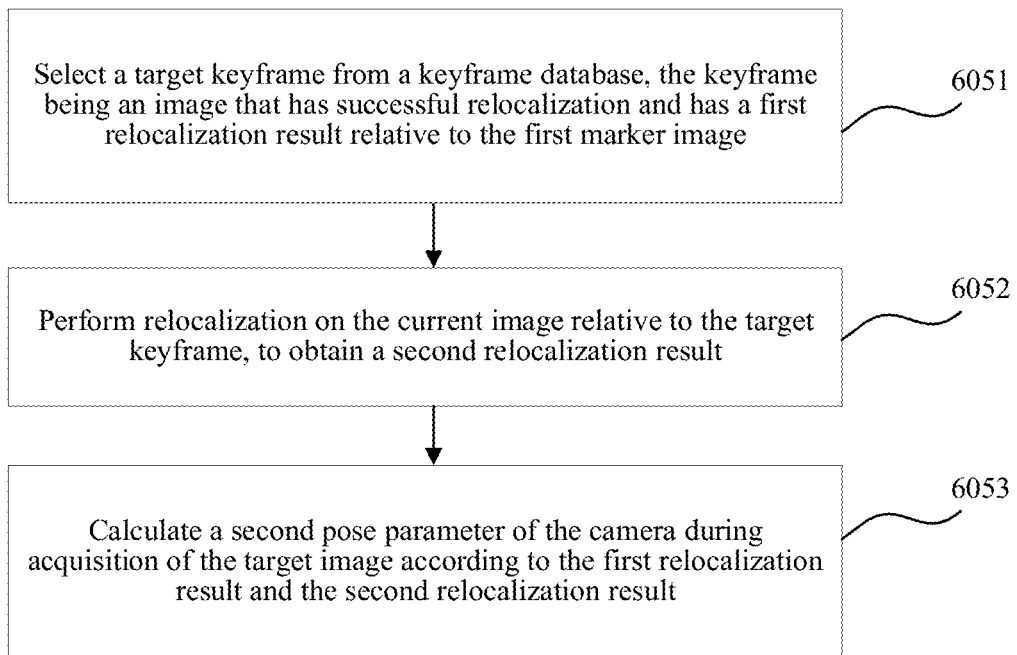
FIG. 11 is a flowchart of a relocalization method in a camera pose tracking process according to an exemplary embodiment of the present disclosure.

In the embodiment based on FIG. 6, the back-end program performs relocalization on the target image relative to the first marker image, to obtain the second pose parameter. As shown in FIG. 11, the foregoing step 605 includes the following sub-steps:

Step 6051: Select a target keyframe from a keyframe database.

The keyframe database stores image information of at least one keyframe. The keyframe is an image that has successful relocalization in a historical camera pose tracking process and has a first relocalization result relative to the first marker image.

There may be more than one relocalization process in a camera pose tracking process. The device chooses some representative images from images with successful relocalization as keyframes and saves the keyframes in the keyframe database. The keyframe database is a database configured to store a keyframe. The keyframe database stores image information of a plurality of keyframes. The image information includes an image of the keyframe, a feature point in the keyframe, and a first relocalization result corresponding to the keyframe. Optionally, the image information further includes: the first global descriptor of the keyframe. The first global descriptor is used to represent the image of the keyframe feature by using a small data amount. Alternatively, the first global descriptor is used to uniquely represent the image of the keyframe feature by using the small data amount.

In a case that relocalization is performed on a target image, the back-end program chooses a target keyframe from the keyframe database. Optionally, the target keyframe is an image at the smallest image distance from the target image in the keyframe database. In different embodiments, the image distance can be represented by any form of an image similarity, an image feature similarity, and a distance between matching feature points. This is not limited in this embodiment of the present disclosure.

In an embodiment, the device chooses a target keyframe from the keyframe database by using a similarity between the first global descriptor of the keyframe and the second global descriptor of the target image. In another embodiment, because an IMU can acquire a reference pose parameter (there may be an error) of the camera during acquisition of the target image, the device chooses a target keyframe from the keyframe database by using the similarity between the first pose parameter of the keyframe and the reference pose parameter of the target image.

Step 6052: Perform relocalization on the target image relative to the target keyframe, to obtain a second relocalization result.

After choosing the target keyframe from the keyframe database, the device performs relocalization on the target image relative to the target keyframe. Optionally, a process of relocalization includes the following steps:

1: Obtain a keyframe feature point and a first relocalization result of the target keyframe.

The keyframe database stores a keyframe feature point on each keyframe and a tracking result of a first camera pose. Optionally, the keyframe feature point is represented by using a SIFT feature descriptor or an ORB feature descriptor. The first relocalization result is a camera pose parameter of the camera during acquisition of a keyframe (referred to as a keyframe pose parameter for short), or, the first relocalization result is a pose change amount including a rotation matrix and a displacement vector of the camera pose parameter of the camera during acquisition of a keyframe relative to a camera pose parameter of the camera during acquisition of the first marker image.

2. Perform feature point tracking on the target image relative to a target keyframe database, to obtain a target feature point matching the keyframe feature point.

Optionally, each matching feature point pair includes one keyframe feature point and one target feature point that match each other.

A tracking algorithm based on visual odometry may be used for feature point tracking. This is not limited in the present disclosure. In an embodiment, a KLT optical flow tracking algorithm is used for feature point tracking. In another embodiment, for feature point tracking, a SIFT feature descriptor extracted based on a SIFT algorithm and an ORB feature descriptor extracted based on an ORB algorithm are used to perform feature point tracking. In the present disclosure, a specific algorithm for feature point tracking is not limited, and a feature point method or a direct method may be used for a feature point tracking process.

In an embodiment, because the target keyframe is an image with successful relocalization, the device has already performed feature point extraction on the target keyframe in a historical process, to obtain N keyframe feature points. The device further performs feature point extraction on the target image, to obtain M candidate feature points; and the device then matches the M candidate feature points one by one against the N initial feature points, to determine at least one matching feature point pair. Each matching feature point pair includes a keyframe feature point and a target feature point. The keyframe feature point is a feature point on the target keyframe, and the target feature point is a candidate feature point having the highest matching degree with the keyframe feature point in the target image.

Optionally, a quantity of the keyframe feature points is greater than or equal to a quantity of target feature points. For example, there are 480 keyframe feature points, and there are 350 target feature points.

3. Calculate a pose change amount of a change of the camera from the keyframe pose parameter to the second pose parameter according to the keyframe feature point and the target feature point, the second pose parameter being used to represent the camera pose of the camera during acquisition of the target image.

Optionally, the device calculates a homography matrix between two frames of image according to the keyframe feature point and the target feature point; and decomposes the homography matrix to obtain the pose change amount including $R_{cm}$ and $T_{cm}$ of the change of the camera from the keyframe pose parameter to the second pose parameter, and use the pose change amount including $R_{cm}$ and $T_{cm}$ as the second relocalization result.

$R_{cm}$ is a rotation matrix of the change of the camera from the keyframe pose parameter to the second pose parameter, and $T_{cm}$ is a displacement vector of the change of the camera from the keyframe pose parameter to the second pose parameter.

Step 6053: Calculate a second pose parameter of the camera during acquisition of the target image according to the first relocalization result and the second relocalization result.

It is assumed that the first relocalization result includes $R_{mf}$ and $T_{mf}$. $R_{mf}$ is a rotation matrix of the change of the camera from the initial pose parameter to the keyframe pose parameter, and $T_{mf}$ is the displacement vector of the change of the camera from the initial pose parameter to the keyframe pose parameter. The second relocalization result includes $R_{cm}$ and $T_{cm}$. $R_{cm}$ is the rotation matrix of the change of the camera from the keyframe pose parameter to the second pose parameter, and $T_{cm}$ is the displacement vector of the change of the camera from the keyframe pose parameter to the second pose parameter. The target pose parameter of the camera during acquisition of the target image is calculated by using the following formula:

$$\begin{bmatrix} R_{relocalite} & T_{relocalite} \\ 0 & 1 \end{bmatrix} = \begin{bmatrix} R_{cm} & S_{mf} * T_{cm} \\ 0 & 1 \end{bmatrix} * \begin{bmatrix} R_{mf} & T_{mf} \\ 0 & 1 \end{bmatrix}$$

$S_{mf}$ being a scale of the target keyframe.

The keyframe database includes: a first-order keyframe with successful first-order relocalization relative to the first marker image, and/or, and an nth-order keyframe with successful nth order relocalization relative to the $(n-1)^{th}$-order keyframe in the keyframe database, n being an integer greater than 1. The foregoing is described by using only an example of the first-order relocalization image. A first relocalization result of an nth-order keyframe may be obtained by performing multiplication on a plurality of pose change amounts. Details are not described herein again in the present disclosure.

In the optional embodiment based on FIG. 6, a projected feature point obtained after the front-end program maps an initial feature point in the first marker image onto the target image, and a process of calculating a scale corresponding to the target image according to an average depth of the projected feature point is as follows:

1. Obtain two-dimensional coordinates of the initial feature point in the first marker image.

The front-end program extracts and caches the two-dimensional coordinates of the initial feature point in the first marker image in advance. The two-dimensional coordinates are homogeneously represented.

2. Perform back projection on the two-dimensional coordinates of the initial feature point, to obtain first three-dimensional coordinates $X_{born}$ of the initial feature point in the three-dimensional space.

The front-end program converts the two-dimensional coordinates of the initial feature point into three-dimensional space by using the following formula, to obtain the first three-dimensional coordinates $X_{born}$ of the initial feature point in the three-dimensional space:

$$X_{born} = d * \begin{bmatrix} \frac{1}{f_x} & 0 & -\frac{c_x}{f_x} \\ 0 & \frac{1}{f_y} & -\frac{c_y}{f_y} \\ 0 & 0 & 1 \end{bmatrix} * x_{born},$$

where $f_x$, $f_y$, $c_x$, and $c_y$ are built-in parameters of the camera, the two-dimensional coordinates $x_{born}$ of the initial feature point are a homogeneous representation of layer-key points in the first marker image, and the three-dimensional point $X_{born}$ is a non-homogeneous representation. It is assumed that an initial depth d of the first marker image is 1.

3. Perform three-dimensional rotation and translation on the first three-dimensional coordinates $X_{born}$ by using the following formula, to obtain the second three-dimensional coordinates $X_{current}$ corresponding to the initial feature point in the target image;

$$X_{current} = R * X_{born} + T,$$

where R is the rotation matrix in the reference pose change amount acquired by the IMU, and T is the displacement vector in the reference pose change amount acquired by the IMU.

4. Project the second three-dimensional coordinates $X_{current}$ onto the target image, to obtain two-dimensional coordinates of the projected feature point in the target image.

The front-end program projects the second three-dimensional coordinates $X_{current}$ onto the target image by using the following formula, to obtain two-dimensional coordinates $X_{current}$ of the projected feature point in the target image:

$$x_{current} = \begin{bmatrix} f_x & 0 & c_x \\ 0 & f_y & c_y \\ 0 & 0 & 1 \end{bmatrix} * X_{current},$$

where $f_x$, $f_y$, $c_x$, and $c_y$ are built-in parameters of the camera.

5. Calculate a scale s of the target image according to an average depth of the projected feature point in the target image.

Figure 12:
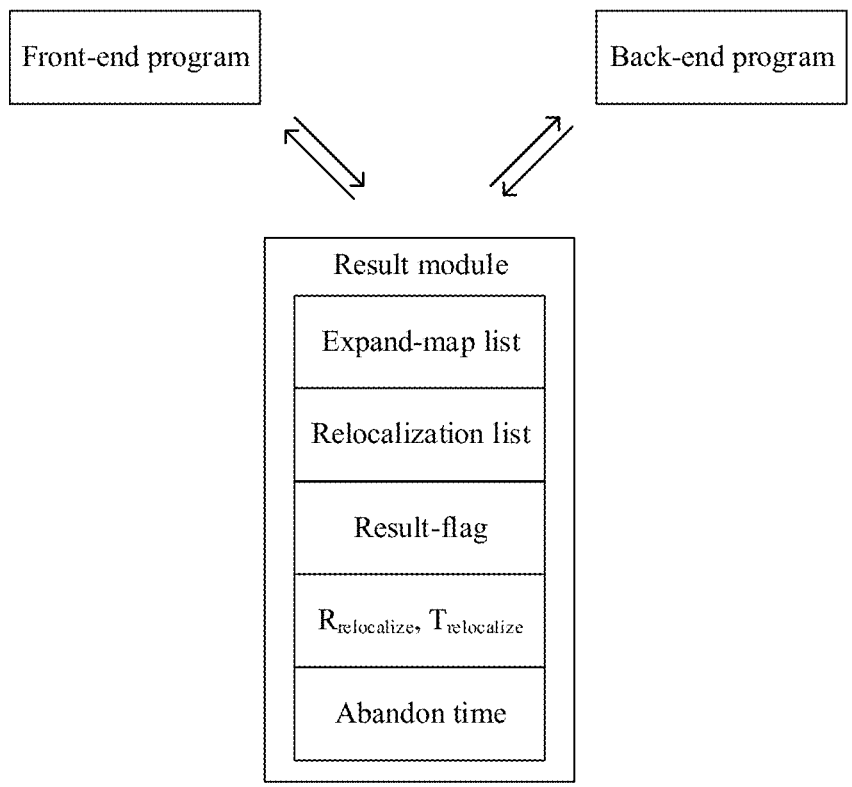
FIG. 12 is a schematic diagram of the principle of a relocalization method according to an exemplary embodiment of the present disclosure.

In the optional embodiment based on FIG. 6, a result module is provided between the front-end program and the back-end program between. The result module is a storage space shared by the front-end program and the back-end program. As shown in FIG. 12, the result module includes a relocalization list, a result-flag, and a result storage location. Optionally, the result module further includes an expand-map list, an abandon time.

The relocalization list is used to store a target image that requires relocalization. Optionally, there is at most one target image in the relocalization list within the same time. In a case that the front-end program needs to perform relocalization, the target image is written into the relocalization list.

The result-flag is used to store a working status of the back-end program. The working status includes ready, have-result, and still-running. Ready represents that the back-end program is in an activated and idle state. Have-result represents that the back-end program has completed calculation of last relocalization, including that relocalization succeeds (OK) or relocalization fails. Still-running represents that calculation is being performed and not completed.

The result storage location is used to store the second pose parameter including $R_{relocalize}$ and $T_{relocalice}$ in a case that relocalization succeeds.

The expand-map list is used to store a candidate image of a keyframe database. The front-end program imports an image into the expand-map list during a normal camera tracking process for the back-end program to expand the keyframe database.

The abandon time is used to store the time at which the front-end program switches an marker image the last time. For example, in a case that the front-end program sets the target image as the $(i+1)^{th}$ marker image, the front-end program records the switching time of the $(i+1)^{th}$ marker image to the abandon time.

Figure 13:
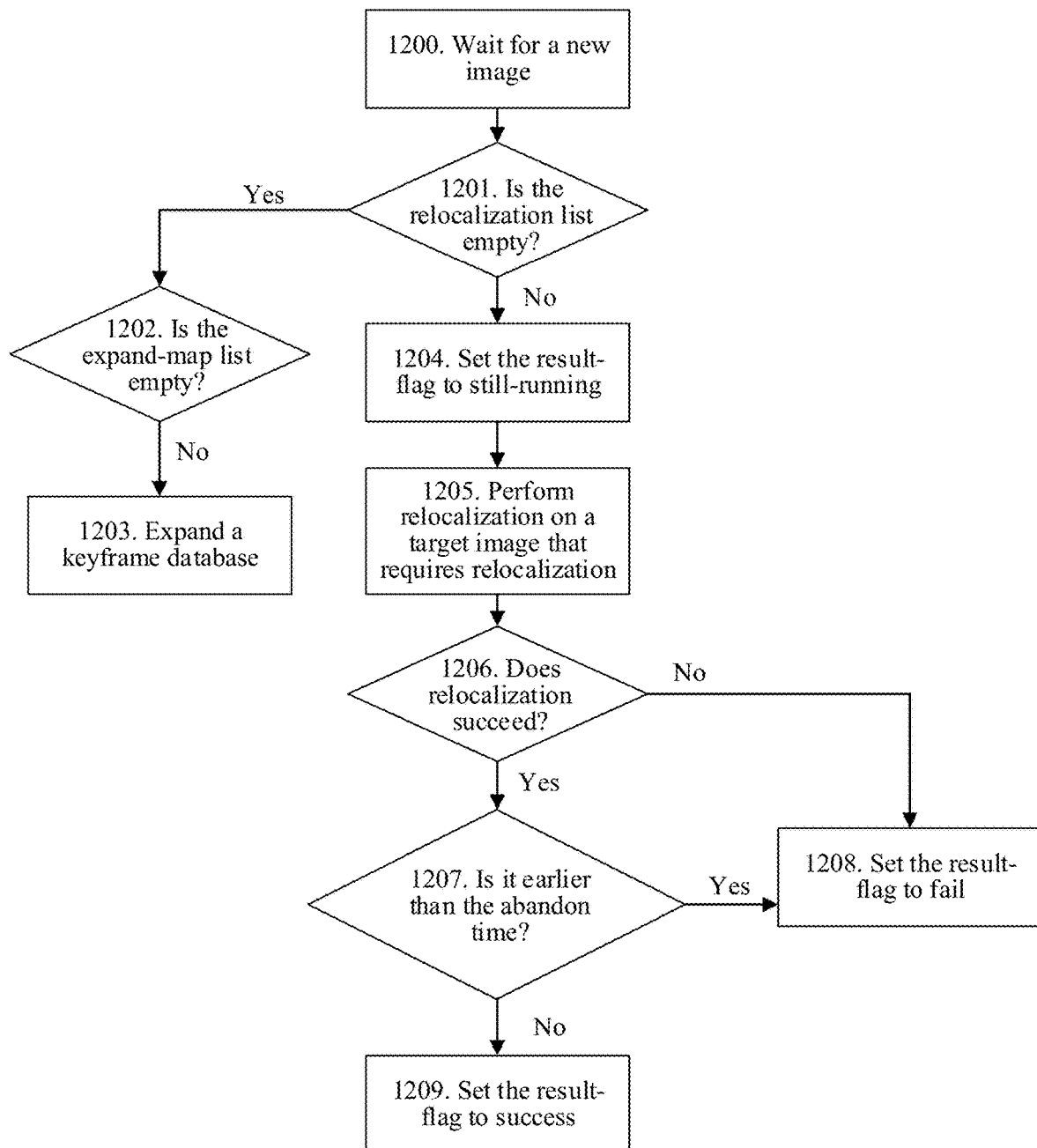
FIG. 13 is a schematic diagram of the working principle of a back-end program according to an exemplary embodiment of the present disclosure.

In an embodiment with reference to FIG. 12, the back-end program is a thread kept running in the back end. The back-end program and the front-end program are run in different threads, and the result module is used to implement inter-process communication. The back-end program uses while (1) to repeatedly perform the step in FIG. 13:

Step 1200: Wait for a new image.

The back-end program monitors the relocalization list and the expand-map list in the result module.

Step 1201: Determine whether the relocalization list is empty.

In a case that the relocalization list is empty, it is determined that the front-end program does not have a target image that requires relocalization, and step 1202 is performed. In a case that the relocalization list is not empty, it is determined that the front-end program has a target image that requires relocalization, and step 1204 is performed.

Step 1202: Determine whether the expand-map list is empty.

Step 1203 is performed in a case that the expand-map list is not empty. Step 1200 is performed again in a case that the expand-map list is empty.

Step 1203: Expand a keyframe database.

The back-end program uses the candidate image in the expand-map list to expand keyframes in the keyframe database, so that keyframes in the keyframe database are added or updated.

Step 1204: Set the result-flag to still-running.

The back-end program sets the result-flag to still-running, and then starts to perform relocalization on the target image.

Step 1205: Perform relocalization on a target image that requires relocalization.

Refer to the description in FIG. 9 or FIG. 11. Details are not described herein again in this embodiment. Optionally, the back-end program first performs relocalization on the target image relative to the first marker image, and performs relocalization again on the target image relative to the keyframe database in a case that relocalization fails. Alternatively, the back-end program performs relocalization in parallel on the target image relative to the first marker image, and performs relocalization on the target image relative to the keyframe database.

Step 1206: Determine whether the relocalization process succeeds.

Step 1207 is performed in a case that relocalization succeeds. Step 1208 is performed in a case that relocalization fails.

Step 1207: Determine whether the time at which the relocalization succeeds is earlier than the abandon time.

The abandon time is used to indicate the time at which the front-end program switches an marker image the last time.

In a case that the time at which relocalization succeeds is earlier than the abandon time, it indicates that after switching the target image to the $(i+1)^{th}$ marker image, the front-end program has already switched the marker image once or several times, the current relocalization result is in an invalid state, and step 1208 is performed. In a case that the time at which the relocalization succeeds is later than the abandon time, the current relocalization result is a valid state, and step 1209 is performed.

Step 1208: Set the result-flag to fail.

The back-end program sets the result-flag to fail.

Step 1209: Set the result-flag to success.

The back-end program sets the result-flag to OK, and writes the second pose parameter including $R_{relocalize}$ and $T_{relocalice}$ into the result module.

Figure 14:
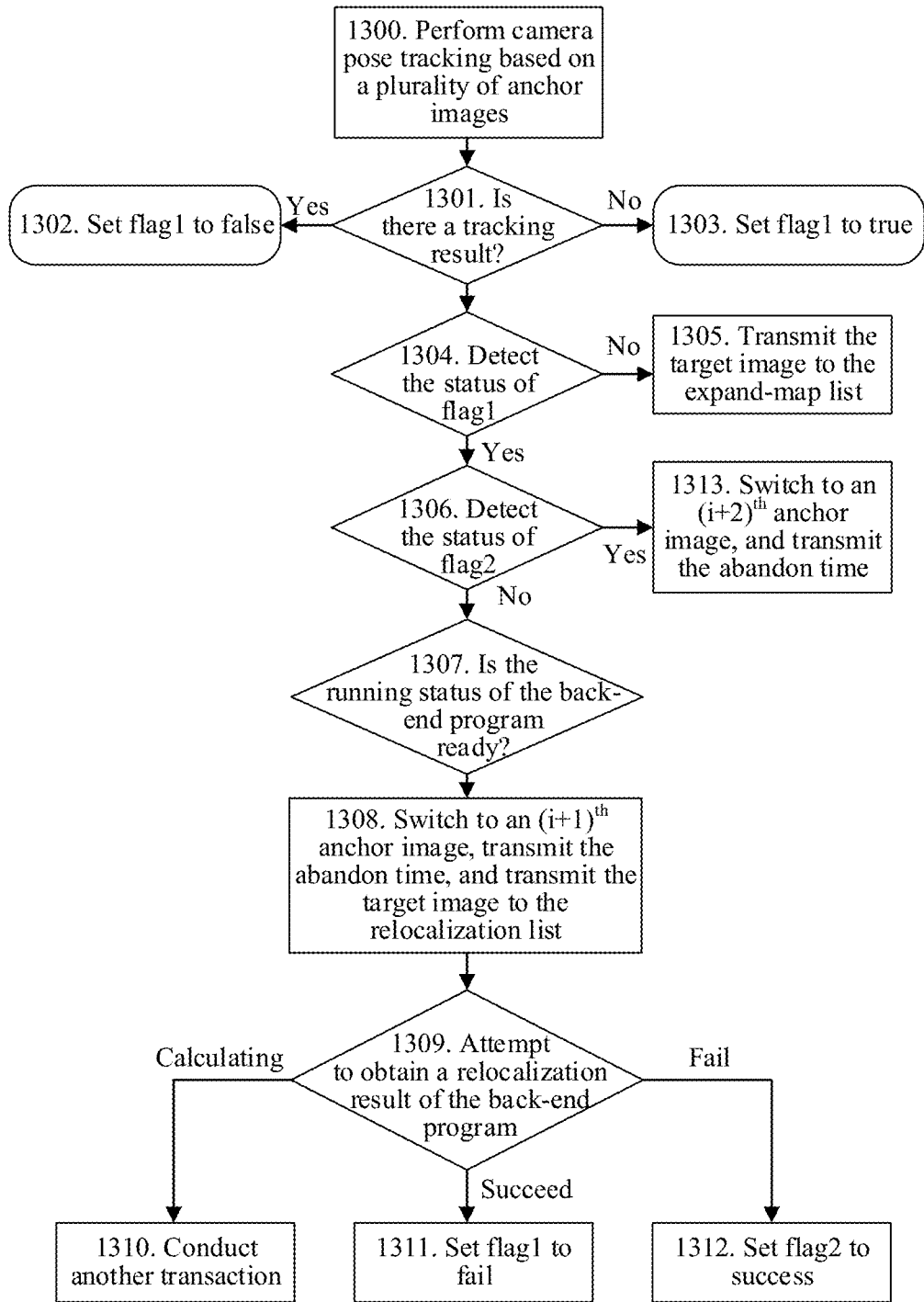
FIG. 14 is a schematic diagram of the working principle of a front-end program according to an exemplary embodiment of the present disclosure.

In an embodiment with reference to FIG. 12, a front-end program is run in a main thread and is responsible for sequentially performing a camera tracking process of a plurality of marker images. The back-end program and the front-end program are run in different threads. The result module is used to implement inter-process communication. flag1 and flag2 are set in the front-end program. flag1 is used to represent whether relocalization needs to be performed, and flag2 is used to represent that relocalization fails and a marker needs to be switched again. The front-end program is used to perform the following steps, as shown in FIG. 14:

Step 1300: Perform camera pose tracking based on the plurality of marker images.

The front-end program is responsible for a camera pose tracking process based on the plurality of marker images. Schematically, it is assumed that the front-end program is performing a camera pose tracking process of an $i^{th}$ marker image.

Step 1301: Determine whether there is a tracking result.

The front-end program obtains a target image acquired after the $i^{th}$ marker image and after feature point tracking is performed on a target image relative to the $i^{th}$ marker image, and determines whether there is a tracking result. Step 1302 is performed in a case that there is a tracking result. Step 1303 is performed in a case that there is no tracking result.

Step 1302: Set flag1 to false.

The camera pose tracking process in step 1300 continues to be performed.

Step 1303: Set flag1 to true.

The front-end program sets flag1 to true, representing that relocalization needs to be performed on the target image.

Step 1304: Detect the status of flag1.

During processing of each frame of image, the front-end program further detects the status of flag1. Step 1305 is performed in a case that the status of flag1 is false. The front-end program transmits the target image to the expand-map list for use by the back-end program to expand the keyframe database. Step 1306 is performed in a case that the status of flag1 is true. The front-end program considers that the target image being processed requires relocalization and detects the state of flag2.

Step 1307 is performed in a case that the status of flag2 is false, representing that the last relocalization succeeds. Step 1313 is performed in a case that the status of flag2 is true, representing that the last relocalization fails.

Step 1307: Detect whether the running status of the back-end program is ready.

The front-end program reads the result-flag in the result module. In a case that the result-flag is ready, it indicates that the back-end program is in an idle state, and relocalization may be performed on the target image.

Step 1308: Switch to an $(i+1)^{th}$ marker image, transmit the abandon time, and transmit the target image to the relocalization list.

The front-end program switches the target image to the $(i+1)^{th}$ marker image, and writes the switching time into the abandon time in the result module.

Step 1309: Attempt to obtain a relocalization result of the back-end program.

The front-end program reads the result-flag in the result module. Step 1310 is performed in a case that the result-flag is still-running. Step 1311 is performed in a case that the result-flag is have-result_ok. Step 1312 is performed in a case that the result-flag is have-result_fails.

Step 1310: Conduct another transaction.

The front-end program may perform a feature point tracking process on a current image after a target image in a calculation process in which the back-end program performs relocalization on the target image.

Step 1311: Set flag1 to fail.

flag1 is set to fail in a case that relocalization of the target image succeeds, representing that relocalization is not required, and a camera tracking process based on the $(i+1)^{th}$ marker image is performed.

Step 1312: Set flag2 to success.

flag2 is set to success in a case that relocalization of the target image fails.

Step 1313: Switch to an $(i+2)^{th}$ marker image, and transmit the abandon time.

In a case that the front-end program obtains a current image after a target image, in a case that flag1 is true and flag2 is true, it represents that a last relocalization process of the back-end program fails. For example, a relocalization process of the target image fails. The front-end program needs to transmit the current image after the target image to the relocalization list, so that the back-end program initiates a relocalization process on the current image. In this case, the front-end program switches the current image to an $(i+2)^{th}$ marker image, and write the switching time into the abandon time in the result module again.

In the optional embodiment based on FIG. 12, the back-end program uses the candidate image in the expand-map list to expand a keyframe in a keyframe database, including the following steps:

Step 1: Obtain a latest candidate image with successful relocalization.

In an initial state, the keyframe database may be empty, and the back-end program only uses the first marker image as an marker image for relocalization. With the execution of the entire camera tracking process, there are an increasing large number of images with successful relocalization relative to the first marker image (or a keyframe that has been added to the keyframe database).

Every time relocalization succeeds, the back-end program uses the image with successful relocalization as a candidate image that may be added to the keyframe database. Optionally, the successful relocalization includes: successful relocalization relative to the first marker image, or, successful relocalization relative to an existing keyframe in the keyframe database.

The back-end program chooses some images from the candidate images as keyframes and adds the keyframes to the keyframe database.

Step 2: Determine whether the candidate image satisfies an addition condition, the addition condition including: a first distance between the candidate image and the first marker image is greater than a first threshold, and/or, a second distance between the candidate image and a keyframe added last time is greater than a second threshold.

Optionally, there needs to be a particular distance between a currently added keyframe and the first marker image, because in a case that two images are relatively close, the relocalization effect of using the currently added keyframe is not significantly different from that of directly using the first marker image.

The back-end program calculates the first distance between the candidate image and the first marker image. The first distance is used to represent an image similarity or a camera pose similarity between the candidate image and the first marker image. In the present disclosure, a specific calculation manner of the first distance is not limited. In an optional embodiment, for an initial feature point in the first marker image, a target feature point matching the initial feature point exists in the candidate image. One initial feature point and a corresponding target feature point constitute a matching feature point pair. An L2 distance (a Euclidean distance corresponding to the norm of L2) is calculated according to each matching feature point pair. An average value of all L2 distances is used as the first distance between the candidate image and the first marker image. For example, the first threshold is 50 pixels. In a case that the first distance between the candidate image and the first marker image is greater than 50 pixels, the candidate image is added to the keyframe database.

Optionally, there needs to be a particular distance between the currently added keyframe and the keyframe added last time, because in a case that two images are relatively close, the relocalization effect of using the currently added keyframe is not significantly different from that of using the keyframe added last time.

The back-end program calculates the second distance between the candidate image and the keyframe added last time. The second distance is used to represent an image similarity or a camera pose similarity between the candidate image and the keyframe added last time. In the present disclosure, a specific calculation manner of the second distance is not limited. In an optional embodiment, a quantity of relocalization images between the candidate image and the keyframe added last time is used as the second distance. For example, the second threshold is 10. In a case that the quantity of relocalization images between the candidate image and the keyframe added last time exceeds 10, the candidate image is added to the keyframe database.

Step 3. Add the candidate image to the keyframe database in a case that the candidate image satisfies the addition condition.

In a case that it is determined that the candidate image satisfies the addition condition, the candidate image is added to the keyframe database as a keyframe. Optionally, a first global descriptor of the keyframe, a keyframe feature point, a positioning result of the first relocalization are stored in the keyframe database. The first global descriptor is used to represent the image of the keyframe feature by using a small data amount, and the positioning result of the first relocalization may be represented by a keyframe pose parameter of the camera during acquisition of a keyframe or may be represented by the pose change amount of the change of the camera from the initial pose parameter to the keyframe pose parameter.

Step 4: Skip adding the candidate image to the keyframe database in a case that the candidate image does not satisfy the addition condition.

The candidate image is not added to the keyframe database in a case that the first distance between the candidate image and the first marker image is less than the first threshold, or, the second distance between the candidate image and the keyframe added last time is less than the second threshold.

Optionally, the keyframe satisfying the foregoing addition condition may be used to expand the keyframe database, but too many keyframes cause calculation amount load to a relocalization process, making it difficult to find a desired image, and therefore are not recommended in the keyframe database. In a schematic example, there are 1000 or fewer keyframes in the keyframe database.

A similarity between the candidate image and an existing keyframe is calculated in a case that the candidate image satisfies the addition condition and a quantity of keyframes in the keyframe database reaches a maximum value (for example, 1000). A keyframe with the highest similarity is deleted from the keyframe database, and the candidate image is added to the keyframe database.

In a schematic example, the foregoing relocalization method in a camera pose tracking process may be used in an AR program. By means of the relocalization method, a pose of a camera on an electronic device can be tracked in real time according to scene information in the real world, and a display position of an AR element in an AR application is adjusted and changed according to a tracking result. An AR program run on the mobile phone in FIG. 1 or FIG. 2 is used as an example. In a case that a still cartoon character standing on a book needs to be displayed, no matter how a user moves the mobile phone, it is only necessary to change a display position of the cartoon character according to a pose change of a camera on the mobile phone, so that the standing position of the cartoon character on the book can be kept unchanged.

The following provides apparatus embodiments of the present disclosure. For details that are not specifically described in the apparatus embodiments, reference may be made to the foregoing method embodiments.

Figure 15:
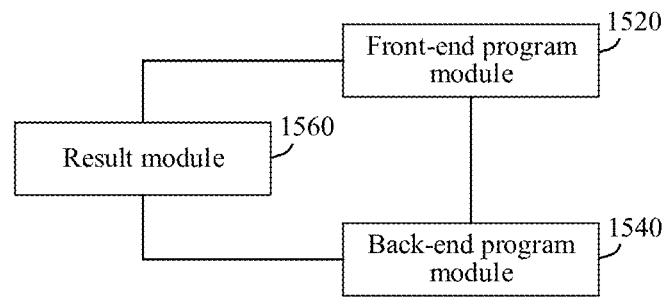
FIG. 15 is a block diagram of a relocalization apparatus in a camera pose tracking process according to an exemplary embodiment of the present disclosure.

FIG. 15 is a block diagram of a relocalization apparatus in a camera pose tracking process according to an exemplary embodiment of the present disclosure. The relocalization apparatus may be implemented by software, hardware or a combination of software and hardware as an entire electronic device (or referred to as a mobile electronic device) or a part of the electronic device. The relocalization apparatus includes a front-end program module 1520 and a back-end program module 1540. The front-end program module 1520 is configured to sequentially perform a camera pose tracking process on a plurality of marker images.

The front-end program module 1520 is further configured to obtain a target image acquired after an $i^{th}$ marker image in the plurality of marker images, i being a positive integer.

The front-end program module 1520 is further configured to: switch the target image to an $(i+1)^{th}$ marker image in a case that the target image satisfies a relocalization condition, and transmit the target image to the back-end program module.

The front-end program module 1520 is further configured to: obtain a current image acquired after the target image, and perform feature point tracking on the current image relative to the target image to obtain a first pose parameter, the first pose parameter being used to represent a camera pose change from the target image to the current image.

The back-end program module 1540 is configured to: perform relocalization on the target image to obtain a second pose parameter, and transmit the second pose parameter to the front-end program, the second pose parameter being used to represent a camera pose change from the first marker image to the target image.

The front-end program module 1520 is configured to calculate a current pose parameter of the current image according to the first pose parameter and the second pose parameter.

In an optional embodiment, the back-end program module 1540 is configured to perform relocalization on the target image relative to the first marker image, to obtain the second pose parameter; and/or, the back-end program module 1540 is configured to perform relocalization on the target image relative to a keyframe in a keyframe database, to obtain the second pose parameter, the keyframe being an image the has successful relocalization and has a relocalization result relative to the first marker image.

In an optional embodiment, the keyframe database includes:

a first-order keyframe with successful first-order relocalization relative to the first marker image; and/or, an nth-order keyframe with successful nth-order relocalization relative to the (n−1)$^{th}$-order keyframe in the keyframe database, n being an integer greater than 1.

In an optional embodiment, the front-end program module 1520 is configured to calculate a current pose parameter of the current image according to the first pose parameter and the second pose parameter, including:

calculating a current pose parameter including $R_n$ and $T_n$ according to the following formula:

$$\begin{bmatrix} R_n & T_n \\ 0 & 1 \end{bmatrix} = \begin{bmatrix} R_{ca} & s*T_{ca} \\ 0 & 1 \end{bmatrix} * \begin{bmatrix} R_{relocalize} & T_{relocalize} \\ 0 & 1 \end{bmatrix},$$

the first pose parameter including a first rotation matrix $R_{ca}$ and a first displacement vector $T_{ca}$, the second pose parameter including a second rotation matrix $R_{relocalize}$ and a second displacement vector $T_{relocalice}$, and s being a scale corresponding to the target image.

In an optional embodiment, the front-end program module 1520 is configured to map an initial feature point in the first marker image onto the target image to obtain a projected feature point, and calculate a scale corresponding to the target image according to an average depth of the projected feature point.

In an optional embodiment, the apparatus further includes a result module 1560, the result module 1560 being a storage space shared by the front-end program module and the back-end program module, where the front-end program module 1520 is configured to write the target image into a relocalization image list in the result module 1560; and the back-end program module 1540 is configured to read the target image from the relocalization image list.

In an optional embodiment, the front-end program module 1520, configured to detect whether a result status bit in the result module 1560 is a ready state; the front-end program module 1520 is configured to write the target image into the relocalization image list in the result module 1560 in a case that a detection result is that the result status bit is the ready state.

In an optional embodiment, the back-end program module 1540 is configured to write the second pose parameter into a result storage location in the result module, the result module 1560 being a storage space shared by the front-end program module 1520 and the back-end program module 1540; and the front-end program module 1520 is configured to read the second pose parameter from the result storage location.

In an optional embodiment, the front-end program module 1520 is configured to write the target image into an expand-map list in the result module; and the back-end program module 1540 is configured to: read the target image from the expand-map list in a case that the target image has successful relocalization and satisfies a preset condition, and add the target image to the keyframe database.

In a case that the relocalization apparatus in a camera pose tracking process provided in the foregoing embodiments implements relocalization, only divisions of the foregoing functional modules are described by using an example. During actual application, the foregoing functions may be allocated to and completed by different functional modules according to requirements, that is, the internal structure of the device is divided into different functional modules, to complete all or some of the foregoing described functions. In addition, the relocalization apparatus provided in the foregoing embodiments belongs to the same concept as the embodiments of the relocalization method. For a specific implementation process of the relocalization apparatus, refer to the method embodiments for details. Details are not described herein again.

Figure 16:
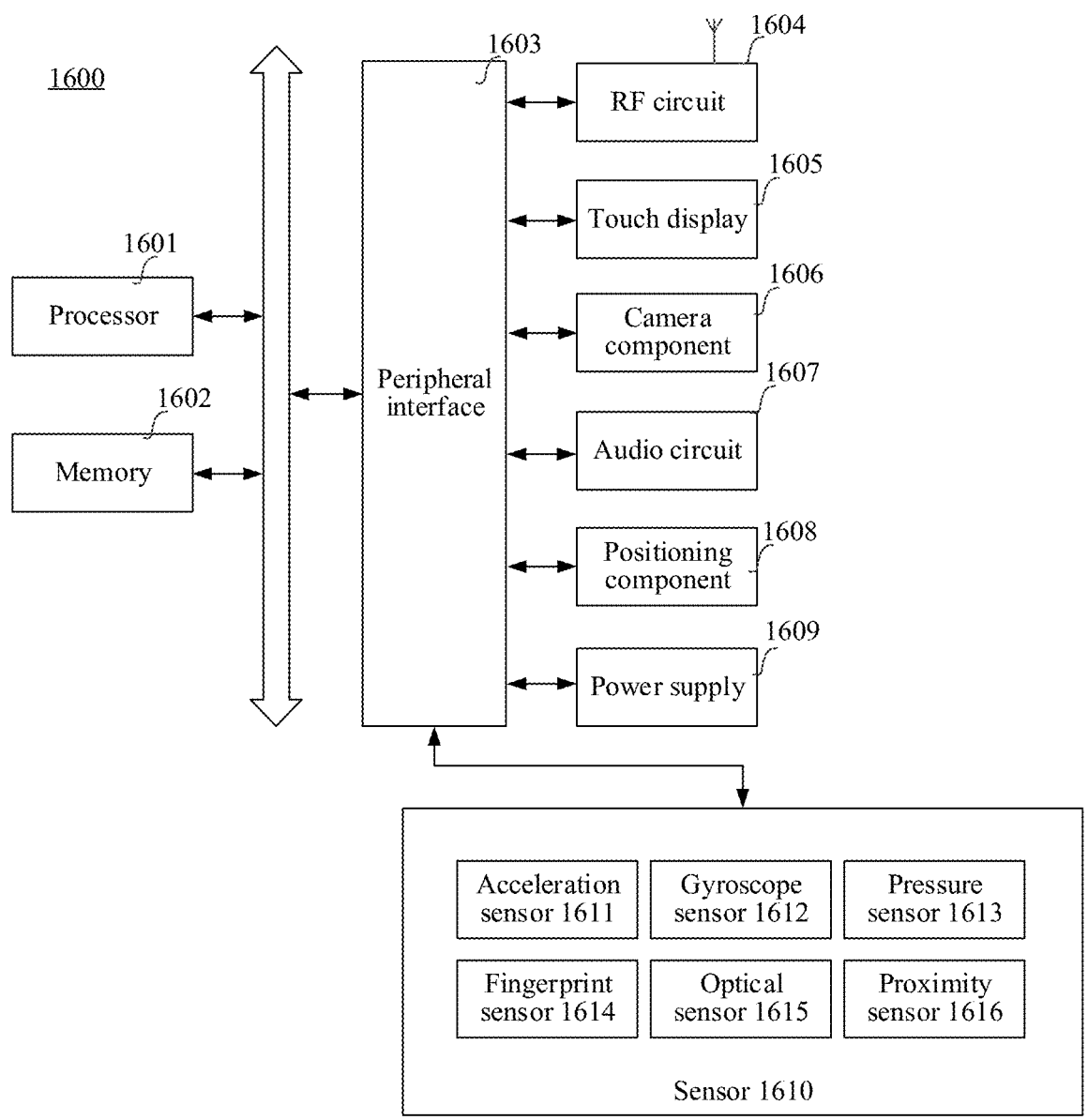
FIG. 16 is a block diagram of an electronic device according to an exemplary embodiment of the present disclosure.

FIG. 16 is a structural block diagram of an electronic device 1600 according to an exemplary embodiment of the present disclosure. The electronic device 1600 may be a smart phone, a tablet computer, a Moving Picture Experts Group Audio Layer III (MP3) player, a Moving Picture Experts Group Audio Layer IV (MP4) player, a laptop computer or a desktop computer. The electronic device 1600 may also be referred to as a user device, a portable electronic device, a laptop electronic device, and a desktop electronic device, among other names.

Generally, the electronic device 1600 includes a processor 1601 and a memory 1602.

The processor 1601 may include one or more processing cores, for example, a 4-core processor, an 8-core processor, and the like. The processor 1601 may be implemented in at least one hardware form of a digital signal processor (DSP), a field-programmable gate array (FPGA), and a programmable logic array (PLA). The processor 1601 may also include a main processor and a co-processor. The main processor is a processor configured to process data in a wake-up state or is referred to as a central processing unit (CPU). The co-processor is a low power consumption processor configured to process data in a standby state. In some embodiments, the processor 1601 may be integrated with a graphics processing unit (GPU). The GPU is configured to render and draw content that needs to be displayed on a display. In some embodiments, the processor 1601 may further include an artificial intelligence (AI) processor. The AI processor is configured to process a computing operation related to machine learning.

The memory 1602 may include one or more computer-readable storage media. The computer-readable storage medium may be non-transient. The memory 1602 may further include a high-speed random access memory (RAM) and a non-volatile memory such as one or more magnetic disk storage devices or flash memory storage devices. In some embodiments, the non-transient computer-readable storage medium in the memory 1602 is configured to store at least one instruction. The at least one instruction is executed by the processor 1601 to implement the relocalization method in a camera pose tracking process provided in the method embodiments of the present disclosure.

In some embodiments, the electronic device 1600 further optionally includes a peripheral interface 1603 and at least one peripheral. The processor 1601, the memory 1602, and the peripheral interface 1603 may be connected by a bus or a signal line. Peripherals may be connected to the peripheral interface 1603 by a bus, a signal line or a circuit board. Specifically, the peripheral includes at least one of a radio frequency (RF) circuit 1604, a touch display 1605, a camera component 1606, an audio circuit 1607, a positioning component 1608, and a power supply 1609.

The peripheral interface 1603 may be configured to connect at least one peripheral related to an input/output (I/O) to the processor 1601 and the memory 1602. In some embodiments, the processor 1601, the memory 1602, and the peripheral interface 1603 are integrated in one same chip or circuit board. In some other embodiments, any one or two of the processor 1601, the memory 1602, and the peripheral interface 1603 may be separately implemented on a chip or circuit board. This is not limited in this embodiment.

The RF circuit 1604 is configured to receive and transmit an RF signal, which is also referred to as electromagnetic signal. The RF circuit 1604 communicates with a communications network and another communication device by using an electromagnetic signal. The RF circuit 1604 converts an electrical signal into an electromagnetic signal for transmission, or, converts a received electromagnetic signal into an electrical signal. Optionally. The RF circuit 1604 includes an antenna system, an RF transceiver, one or more amplifiers, a tuner, an oscillator, a DSP, a CODEC chip set, a subscriber identity module card, and the like. The RF circuit 1604 may communicate with another electronic device by using at least one wireless communication protocol. The wireless communication protocol includes, but is not limited to, a World Wide Web, a metropolitan area network, an intranet, various generations of mobile communications networks (2G, 3G, 4G, and 5G), a wireless local area network and/or a Wireless Fidelity (Wi-Fi) network. In some embodiments. The RF circuit 1604 may further include a Near Field Communication (NFC)-related circuit. This is not limited in the present disclosure.

The display 1605 is configured to display a user interface (UI). The UI may include a graphic, a text, an icon, a video, and any combination thereof. In a case that the display 1605 is a touch display, the display 1605 further has a capability of acquiring a touch signal on or above the surface of the display 1605. The touch signal may be input as a control signal into the processor 1601 for processing. In this case, the display 1605 may further be configured to provide a virtual button and/or a virtual keyboard, which is also referred to as a soft button and/or a soft keyboard. In some embodiments, there may be one display 1605, disposed on a front panel of the electronic device 1600. In some other embodiments, there may be at least two displays 1605, respectively disposed on different surfaces of the electronic device 1600 or designed to be foldable. In some other embodiments, the display 1605 may be a flexible display, disposed on a curved surface or folded surface of the electronic device 1600. Even, the display 1605 may further be disposed to be a non-rectangular irregular graphic, that is, an irregular-shaped screen. The display 1605 may be manufactured by using a material such as a liquid crystal display (LCD) or an organic light-emitting diode (OLED).

The camera component 1606 is configured to acquire an image or a video. Optionally, the camera component 1606 includes a front-facing camera and a rear-facing camera. Generally, the front-facing camera is disposed on the front panel of the electronic device, and the rear-facing camera is disposed on the back surface of the electronic device. In some embodiments, there are at least two rear-facing cameras, which are respectively any one of a main camera, a depth-of-field camera, a wide-angle camera, a long-focus camera, to implement the integration of the main camera and the depth-of-field camera to implement a background blurring function, the integration of the main camera and the wide-angle camera to implement panoramic photography and a virtual reality (VR) photographing function or another integrated photographing function. In some embodiments, the camera component 1606 may further include a flash. The flash may be a mono color temperature flash or may be a dual color temperature flash. The dual color temperature flash is a combination of a warm light flash and a cold light flash and may be used for light compensation at different color temperatures.

The audio circuit 1607 may include a microphone and a loudspeaker. The microphone is configured to acquire sound waves from a user and an environment and convert the sound waves into electrical signals for input into the processor 1601 for processing or input into the RF circuit 1604 to implement voice communication. For stereo acquisition or noise reduction, there may be a plurality of microphones, respectively disposed at different positions of the electronic device 1600. The microphone may be alternatively a microphone array or an omnidirectional microphone. The loudspeaker is configured to convert an electrical signal from the processor 1601 or the RF circuit 1604 into a sound wave. The loudspeaker may be a conventional diaphragm loudspeaker or may be a piezoelectric ceramic loudspeaker. In a case that the loudspeaker is a piezoelectric ceramic loudspeaker, an electrical signal can be converted into a sound wave audible to humans, and an electrical signal can be converted into a sound wave inaudible to humans for uses such as ranging. In some embodiments, the audio circuit 1607 may further include an earphone jack.

The positioning component 1608 is configured to locate a current geographical position of the electronic device 1600, to implement navigation or a location-based service (LBS). The positioning component 1608 may be a positioning component based on the US' global positioning system (GPS), China's BeiDou system, Russia's GLONASS, and Europe's Galileo system.

The power supply 1609 is configured to supply power to various components in the electronic device 1600. The power supply 1609 may be alternating-current (AC) power, direct-current (AC) power, a disposable battery or a rechargeable battery. In a case that the power supply 1609 includes a rechargeable battery, the rechargeable battery may be a wired charging battery or a wireless charging battery. The wired charging battery is a battery charged by using a wired circuit, and the wireless charging battery is a battery charged by using a wireless coil. The rechargeable battery may be alternatively used to support a fast charging technology.

In some embodiments, the electronic device 1600 further includes one or more sensors 1610. The one or more sensors 1610 include, but are not limited to, an acceleration sensor 1611, a gyroscope sensor 1612, a pressure sensor 1613, a fingerprint sensor 1614, an optical sensor 1615, and a proximity sensor 1616.

The acceleration sensor 1611 may detect accelerations on three coordinate axes of a coordinate system established by the electronic device 1600. For example, the acceleration sensor 1611 may be configured to detect the components of the gravitational acceleration on the three coordinate axes. The processor 1601 may control the touch display 1605 according to a gravitational acceleration signal acquired by the acceleration sensor 1611 to display a user interface in a landscape view or a portrait view. The acceleration sensor 1611 may further be configured to acquire game data or movement data of a user.

The gyroscope sensor 1612 may detect a body direction and a rotational angle of the electronic device 1600, and the gyroscope sensor 1612 may coordinate with the acceleration sensor 1611 to acquire a 3D motion of a user on the electronic device 1600. The processor 1601 may implement the following functions according to data acquired by the gyroscope sensor 1612: motion sensing (for example, a UI is changed according to a tilt operation of a user), image stabilization during photographing, game control, and inertial navigation.

The pressure sensor 1613 may be disposed at a side frame of the electronic device 1600 and/or at an underlying layer of the touch display 1605. In a case that the pressure sensor 1613 is disposed at a side frame of the electronic device 1600, a holding signal of the electronic device 1600 by a user may be detected, and the processor 1601 performs left/right hand recognition or fast operation according to the holding signal acquired by the pressure sensor 1613. In a case that the pressure sensor 1613 is disposed at an underlying layer of the touch display 1605, and the processor 1601 controls an operable control on the UI according to a pressure operation on the touch display 1605 by the user. The operable control includes at least one of a button control, a scroll bar control, an icon control, and a menu control.

The fingerprint sensor 1614 is configured to acquire a fingerprint of a user, and the processor 1601 recognizes the identity of the user according to the fingerprint acquired by the fingerprint sensor 1614, or, the fingerprint sensor 1614 recognizes the identity of the user according to the acquired fingerprint. In a case that it is recognized that the identity of the user is a trusted identity, the processor 1601 authorizes the user to perform a related sensitive operation. The sensitive operation includes unlocking a screen, viewing encrypted information, downloading software, making a payment, changing a setting, and the like. The fingerprint sensor 1614 may be disposed on a front surface, a rear surface or a side surface of the electronic device 1600. In a case that the electronic device 1600 is provided with a physical button or a manufacturer logo, the fingerprint sensor 1614 may be integrated with the physical button or manufacturer logo.

The optical sensor 1615 is configured to acquire environmental light intensity. In an embodiment, the processor 1601 may control the display brightness of the touch display 1605 according to the environmental light intensity acquired by the optical sensor 1615. Specifically, the display brightness of the touch display 1605 is increased in a case that the environmental light intensity is relatively high. The display brightness of the touch display 1605 is reduced in a case that environmental light intensity is relatively low. In another embodiment, the processor 1601 may further dynamically adjust a photographing parameter of the camera component 1606 according to the environmental light intensity acquired by the optical sensor 1615.

The proximity sensor 1616 is also referred to as a distance sensor and is usually disposed on the front panel of the electronic device 1600. The proximity sensor 1616 is configured to acquire a distance between a user and the front surface of the electronic device 1600. In an embodiment, in a case that the proximity sensor 1616 detects that the distance between the user and the front surface of the electronic device 1600 gradually decreases, the processor 1601 controls the touch display 1605 to switch from a screen-on state to a screen-off state. In a case that the proximity sensor 1616 detects that the distance between the user and the front surface of the electronic device 1600 gradually increases, the processor 1601 controls the touch display 1605 to switch from the screen-off state to the screen-on state.

A person skilled in the art may understand that, the structure shown in FIG. 16 does not constitute a limitation to the electronic device 1600. More or fewer components than those shown in the figure may be included, or some component may be combined, or different component arrangements may be used.

The present disclosure further provides a computer-readable storage medium, the storage medium storing at least one instruction, at least one program, and a code set or an instruction set, and the at least one instruction, the at least one program, and the code set or the instruction set being loaded and executed by a processor to implement the relocalization method in a camera pose tracking process provided in the foregoing method embodiments.

The present disclosure further provides a computer program product, when run on an electronic device, causing the electronic device to perform the relocalization method in a camera pose tracking process in the foregoing method embodiments.

The sequence numbers of the foregoing embodiments of the present disclosure are merely for description purpose and do not indicate the preference of the embodiments.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a read-only memory (ROM), a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A relocalization method in a camera pose tracking process for a device, comprising:
   obtaining, by a front-end program run on a device, a target image acquired after an $i^{th}$ marker image in the plurality of marker images, i being a positive integer, the front-end program responsible for sequentially performing the camera pose tracking process on a plurality of marker images;
   determining, by the front-end program, the target image as an $(i+1)^{th}$ marker image upon determining that the target image satisfies a relocalization condition;
   transmitting, by the front-end program, the target image to a back-end program run on the device;
   performing obtaining, by the front-end program, feature point tracking on a current image acquired after the target image relative to the target image to obtain a first pose parameter, the first pose parameter representing a camera pose change from the target image to the current image;
   performing, by the back-end program, relocalization on the target image to obtain a second pose parameter, and transmitting the second pose parameter to the front-end program, the second pose parameter representing the camera pose change from the first marker image to the target image; and
   calculating, by the front-end program, a current pose parameter of the current image according to the first pose parameter and the second pose parameter.

2. The method according to claim 1, wherein the performing, by the back-end program, relocalization on the target image to obtain a second pose parameter comprises at least one of:
   performing, by the back-end program, relocalization on the target image relative to the first marker image, to obtain the second pose parameter;

or,
performing, by the back-end program, relocalization on the target image relative to a keyframe in a keyframe database, to obtain the second pose parameter, the keyframe being an image that has a successful relocalization result relative to the first marker image.

3. The method according to claim 2, wherein the keyframe database comprises at least one of:
a first-order keyframe with successful first-order relocalization relative to the first marker image;
or,
an nth-order keyframe with successful nth-order relocalization relative to the $(n-1)^{th}$-order keyframe in the keyframe database, n being an integer greater than 1.

4. The method according to claim 1, wherein the calculating, by the front-end program, a current pose parameter of the current image according to the first pose parameter and the second pose parameter comprises:
calculating a current pose parameter comprising $R_n$ and $T_n$ according to the following formula:

$$\begin{bmatrix} R_n & T_n \\ 0 & 1 \end{bmatrix} = \begin{bmatrix} R_{ca} & s*T_{ca} \\ 0 & 1 \end{bmatrix} * \begin{bmatrix} R_{relocalize} & T_{relocalize} \\ 0 & 1 \end{bmatrix},$$

the first pose parameter comprising a first rotation matrix $R_{ca}$ and a first displacement vector $T_{ca}$, the second pose parameter comprising a second rotation matrix $R_{relocalize}$ and a second displacement vector $T_{relocalize}$, and s being a scale corresponding to the target image.

5. The method according to claim 4, further comprising:
mapping, by the front-end program, an initial feature point in the first marker image onto the target image to obtain a projected feature point, and calculating the scale corresponding to the target image according to an average depth of the projected feature point.

6. The method according to claim 1, wherein the transmitting, by the front-end program, the target image to the back-end program comprises:
writing, by the front-end program, the target image into a relocalization image list in a result storage space shared by the front-end program and the back-end program; and
reading, by the back-end program, the target image from the relocalization image list.

7. The method according to claim 6, wherein the writing, by the front-end program, the target image into a relocalization image list comprises:
detecting, by the front-end program, whether a result status bit in the result storage space is a ready state; and
writing, by the front-end program, the target image into the relocalization image list in the storage space upon detecting the result status bit is the ready state.

8. The method according to claim 6, further comprising:
writing, by the front-end program, the target image into an expand-map list in the result storage space; and
reading, by the back-end program, the target image from the expand-map list upon determining that the target image has successful relocalization and satisfies a preset condition, and adding the target image to the keyframe database.

9. The method according to claim 1, wherein the transmitting, by the back-end program, the second pose parameter to the front-end program comprises:

writing, by the back-end program, the second pose parameter into a result storage location in a result storage space shared by the front-end program and the back-end program; and
reading, by the front-end program, the second pose parameter from the result storage location.

10. A relocalization apparatus, comprising: a memory; and one or more processors coupled to the memory and configured to execute a front-end program and a back-end program, wherein the front-end program is configured to:
sequentially perform a camera pose tracking process on a plurality of marker images;
obtain a target image acquired after an $i^{th}$ marker image in the plurality of marker images, i being a positive integer;
determine the target image as an $(i+1)^{th}$ marker image upon determining that the target image satisfies a relocalization condition, and transmit the target image to the back-end program, the back-end program module being configured to: perform relocalization on the target image to obtain a second pose parameter, and transmit the second pose parameter to the front-end program, the second pose parameter representing a camera pose change from the first marker image to the target image;
perform feature point tracking on a current image acquired after the target image relative to the target image to obtain a first pose parameter, the first pose parameter representing a camera pose change from the target image to the current image; and
calculate a current pose parameter of the current image according to the first pose parameter and the second pose parameter.

11. The apparatus according to claim 10, wherein
the back-end program is configured to perform at least one of: relocalization on the target image relative to the first marker image, to obtain the second pose parameter;
or,
relocalization on the target image relative to a keyframe in a keyframe database, to obtain the second pose parameter, the keyframe being an image that has successful relocalization and has a relocalization result relative to the first marker image.

12. The apparatus according to claim 11, wherein the keyframe database comprises at least one of:
a first-order keyframe with successful first-order relocalization relative to the first marker image;
or,
an nth-order keyframe with successful nth-order relocalization relative to the $(n-1)^{th}$-order keyframe in the keyframe database, n being an integer greater than 1.

13. The apparatus according to claim 10, wherein
the front-end program is configured to calculate a current pose parameter of the current image according to the first pose parameter and the second pose parameter, comprising:
calculating a current pose parameter comprising $R_n$ and $T_n$ according to the following formula:

$$\begin{bmatrix} R_n & T_n \\ 0 & 1 \end{bmatrix} = \begin{bmatrix} R_{ca} & s*T_{ca} \\ 0 & 1 \end{bmatrix} * \begin{bmatrix} R_{relocalize} & T_{relocalize} \\ 0 & 1 \end{bmatrix},$$

the first pose parameter comprising a first rotation matrix $R_{ca}$ and a first displacement vector $T_{ca}$, the second pose parameter comprising a second rotation matrix $R_{relocalize}$ and a second displacement vector $T_{relocalice}$, and s being a scale corresponding to the target image.

14. The apparatus according to claim 13, wherein the front-end program is further configured to:
map an initial feature point in the first marker image onto the target image to obtain a projected feature point, and calculate the scale corresponding to the target image according to an average depth of the projected feature point.

15. The apparatus according to claim 10, wherein the memory comprises a result storage space shared by the front-end program module and the back-end program module, wherein
the front-end program is configured to write the target image into the relocalization image list in the result storage space; and
the back-end program is configured to read the target image from the relocalization image list.

16. The apparatus according to claim 15, wherein
the front-end program is configured to: detect whether a result status bit in the result storage space is a ready state; and
write the target image into the relocalization image list upon detecting that the result status bit is the ready state.

17. The apparatus according to claim 15, wherein
the back-end program module is configured to write the second pose parameter into a result storage location in the result storage space; and
the front-end program is configured to read the second pose parameter from the result storage location.

18. The apparatus according to claim 15, wherein
the front-end program is configured to write the target image into an expand-map list in the result storage space; and
the back-end program is configured to: read the target image from the expand-map list upon determining that the target image has successful relocalization and satisfies a preset condition, and add the target image to the keyframe database.

19. A non-transitory computer-readable storage medium, storing at least one instruction, the at least one instruction being loaded and executed by a processor to perform:
obtaining, by a front-end program run on a device, a target image acquired after an $i^{th}$ marker image in the plurality of marker images, i being a positive integer, the front-end program responsible for sequentially performing the camera pose tracking process on a plurality of marker images;
determining, by the front-end program, the target image as an $(i+1)^{th}$ marker image upon determining that the target image satisfies a relocalization condition;
transmitting, by the front-end program, the target image to a back-end program run on the device;
performing obtaining, by the front-end program, feature point tracking on a current image acquired after the target image relative to the target image to obtain a first pose parameter, the first pose parameter representing a camera pose change from the target image to the current image;
performing, by the back-end program, relocalization on the target image to obtain a second pose parameter, and transmitting the second pose parameter to the front-end program, the second pose parameter representing the camera pose change from the first marker image to the target image; and
calculating, by the front-end program, a current pose parameter of the current image according to the first pose parameter and the second pose parameter.

20. The storage medium according to claim 19, wherein the performing, by the back-end program, relocalization on the target image to obtain a second pose parameter comprises at least one of:
performing, by the back-end program, relocalization on the target image relative to the first marker image, to obtain the second pose parameter; or,
performing, by the back-end program, relocalization on the target image relative to a keyframe in a keyframe database, to obtain the second pose parameter, the keyframe being an image that has a successful relocalization result relative to the first marker image.

* * * * *